US010143942B2

(12) United States Patent
Liu et al.

(10) Patent No.: US 10,143,942 B2
(45) Date of Patent: Dec. 4, 2018

(54) MEMBRANE GAS/LIQUID CONTACTOR

(71) Applicant: IDEX Health & Science, LLC, Rohnert Park, CA (US)

(72) Inventors: Quan Liu, Petaluma, CA (US); Carl Sims, Santa Rosa, CA (US); Chris Hankins, Petaluma, CA (US)

(73) Assignee: IDEX Health & Science LLC, Rohnert Park, CA (US)

( * ) Notice: Subject to any disclaimer, the term of this patent is extended or adjusted under 35 U.S.C. 154(b) by 131 days.

(21) Appl. No.: 15/250,292

(22) Filed: Aug. 29, 2016

(65) Prior Publication Data

US 2017/0056788 A1    Mar. 2, 2017

Related U.S. Application Data

(60) Provisional application No. 62/211,409, filed on Aug. 28, 2015.

(51) Int. Cl.
*B01D 19/00*   (2006.01)
*B01D 15/16*   (2006.01)
*B01D 63/08*   (2006.01)

(52) U.S. Cl.
CPC ....... *B01D 19/0031* (2013.01); *B01D 15/166* (2013.01); *B01D 63/087* (2013.01)

(58) Field of Classification Search
CPC .............. B01D 15/166; B01D 19/0031; B01D 2053/221; B01D 2053/222; B01D 63/08; B01D 63/082; B01D 63/087; B01D 63/14; B01D 2313/08; B01D 2313/14
See application file for complete search history.

(56) References Cited

U.S. PATENT DOCUMENTS

| | | | |
|---|---|---|---|
| 3,398,091 A | 8/1968 | Greatorex |
| 3,591,493 A | 7/1971 | Zeineh |
| 3,735,562 A | 5/1973 | Mosseau |
| 3,751,879 A | 8/1973 | Allington |
| 4,110,220 A | 8/1978 | Lavender |
| 5,693,122 A | 12/1997 | Berndt |
| 5,749,942 A | 5/1998 | Seymour |
| 5,876,604 A | 3/1999 | Marshall |
| 5,885,332 A | 3/1999 | Gerner |

(Continued)

FOREIGN PATENT DOCUMENTS

| | | |
|---|---|---|
| EP | 0973031 | 1/2005 |
| EP | 1579901 | 9/2005 |

(Continued)

OTHER PUBLICATIONS

English Language Machine Translation for Ru 2409413 C2. Retrieved from http://translationportal.epo.org on Mar. 2, 2018. (Year: 2018).*

(Continued)

*Primary Examiner* — Jason M Greene
(74) *Attorney, Agent, or Firm* — Haugen Law Firm PLLP

(57) ABSTRACT

A membrane gas-liquid contactor is arranged to define a fluid flow path for contact with a membrane in a manner to improve degassing efficiency. A degassing module housing the membrane is arranged with flow fields for distributing the fluid flow throughout the membrane contact area. The distributed fluid flow may have a uniform membrane contact opportunity.

32 Claims, 17 Drawing Sheets

(56) References Cited

U.S. PATENT DOCUMENTS

| | | |
|---|---|---|
| 5,888,275 A | 3/1999 | Hamasaki et al. |
| 5,980,742 A | 11/1999 | Saitoh |
| 6,171,374 B1 | 1/2001 | Barton et al. |
| 6,248,157 B1 | 6/2001 | Sims et al. |
| 6,258,154 B1 | 7/2001 | Berndt et al. |
| 6,309,444 B1 | 10/2001 | Sims et al. |
| 6,315,815 B1 | 11/2001 | Spadaccini |
| 6,494,938 B2 | 12/2002 | Sims et al. |
| 6,596,058 B2 | 7/2003 | Gerner et al. |
| 6,675,835 B2 | 1/2004 | Gerner |
| 6,709,492 B1 | 3/2004 | Spadaccini |
| 6,949,132 B2 | 9/2005 | Thielen |
| 7,258,329 B2 | 8/2007 | Sasamoto |
| 7,713,331 B2 | 5/2010 | Gerner |
| 8,876,943 B2 | 11/2014 | Gottlieb et al. |
| 9,114,331 B2 | 8/2015 | Gottlieb et al. |
| 2004/0226886 A1* | 11/2004 | Hester .................. B01D 63/08 210/649 |
| 2005/0123727 A1* | 6/2005 | Hester .................. B01D 63/082 428/188 |
| 2010/0294128 A1 | 11/2010 | Schmidt et al. |
| 2011/0155667 A1* | 6/2011 | Charest .................. B01D 63/08 210/651 |
| 2011/0226686 A1* | 9/2011 | Maurer .................. B01D 53/22 210/206 |
| 2011/0290113 A1* | 12/2011 | Borenstein .......... B01D 63/082 95/54 |
| 2012/0160096 A1 | 6/2012 | Gottlieb et al. |
| 2014/0157983 A1* | 6/2014 | Trump .............. B01D 19/0021 95/46 |
| 2015/0053084 A1 | 2/2015 | Gottlieb et al. |
| 2015/0273405 A1* | 10/2015 | Henderson ............. B01D 61/08 210/490 |

FOREIGN PATENT DOCUMENTS

| | | | |
|---|---|---|---|
| GB | 1363176 A | 8/1974 | |
| RU | 2409413 C2 * | 1/2011 | ............ B01D 63/14 |
| SU | 1194258 A | 11/1985 | |
| WO | 2011031333 | 3/2011 | |

OTHER PUBLICATIONS

Written Opinion and Search Report dated Nov. 24, 2016 in international application serial No. PCT/US2016/049277.

* cited by examiner

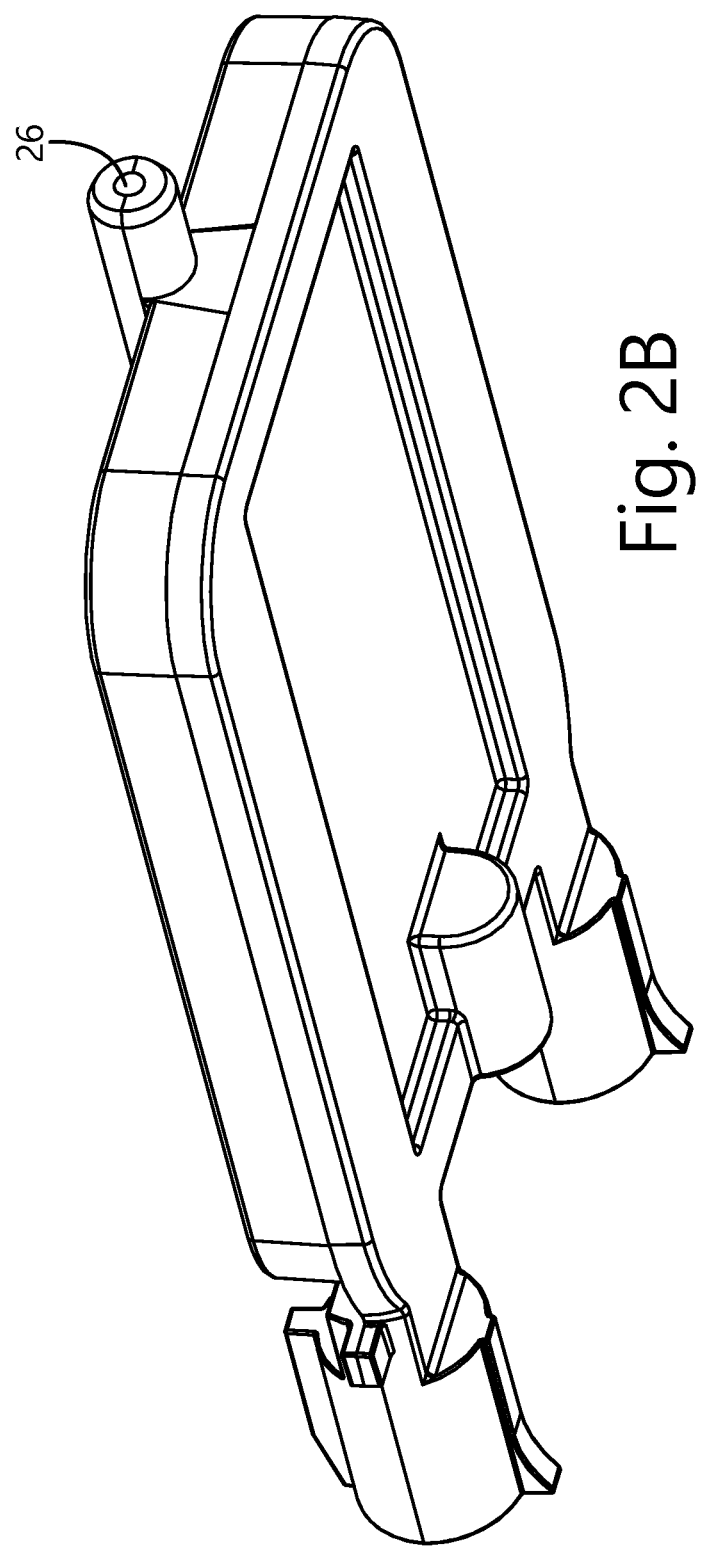

MEMBRANE GAS/LIQUID CONTACTOR

CROSS-REFERENCE TO RELATED APPLICATIONS

This application claims priority to U.S. Provisional Patent Application Ser. No. 62/211,409 filed on Aug. 28, 2015 and entitled "MEMBRANE GAS/LIQUID CONTACTOR," the content of which being incorporated herein in its entirety.

FIELD OF THE INVENTION

The present invention relates to general forms of apparatus for degassing fluids generally, and more particularly to apparatus which are useful in degassing mobile phase solvents and solutions in chromatographic applications.

BACKGROUND OF THE INVENTION

Many applications utilizing fluids such as liquid solvents, aqueous solutions containing dissolved solids, and the like require highly accurate and metered delivery of fluids. As solutions and solvents are generally stored at atmospheric pressure in contact with air, the solutions and solvents become saturated with dissolved air. In the case of dispensing systems, dissolved air can form bubbles within connecting lines, syringes, pumps and detection means as conditions such as temperature and pressure change as the fluid passes through the system. In many systems such as those in clinical analyzers, bubble monitors are used to monitor a dispensed fluid to detect a bubble passing into a volume critical region. A software program may then be triggered to divert the fluid to a waste position, and to then purge the system and re-start the fluid dispensation. If the fluid is a reagent used in a chemical reaction, repeated dispensing of the reagent is both time consuming and costly.

In analytical chemistry, particularly High Pressure Liquid Chromatography (HPLC), it has long been known that the reduction of dissolved air from the mobile phase is of critical importance to the stability of system flow rate and, accordingly, to the proper identification of compounds separated by the HPLC system. Also important to HPLC is the degassing of mobile phase solvents that are blended together using multiple solenoid valves prior to introduction into the inlet of the HPLC pump. This form of HPLC pump design is referred to as "low pressure mixing" in which the HPLC system controller opens and closes solenoid valves associated with each solvent during the intake stroke of the HPLC pump to effect a solvent mixture necessary for developing a chromatogram by the HPLC system. Such low pressure mixing systems are only possible using degassed solvents since the formation of bubbles upon the immediate mixing of the proportioned solvents would otherwise prevent the formation of an accurate solvent composition. An examination into the effect of the change in capacity of a water and alcohol mixture at various concentrations for dissolved oxygen and nitrogen (air) is discussed in Tokunaga, J Chem & Eng Data, Vol 20, No 1, 1975. A conversion of the molar basis for this phenomenon from Molar concentration to percentages by the inventors reveals the relationship used over the years to determine efficiency of removal of the components of air in liquids necessary to mitigate outgassing. Generally, it is desirable to eliminate greater than 62% of the air dissolved in each solvent such that the degassed solvents may be mixed together without the amount of air contributed from any one solvent causing outgassing and bubble formation in the mixture.

Bubble formation during the intake stroke on an HPLC pump may also be limited or prevented by suitable degassing of the mobile phase. Typical HPLC pumps contain a check valve at the inlet, wherein cavitation during the intake stroke may lower the local pressure within the pump chamber to a point at which a gas-saturated solvent will form bubbles. Such bubble formation can prevent the check valve from properly sealing when the pump piston compresses the fluid contained in the pumping chamber. Improper check valve sealing may completely stop the pumping action and therefore prevent the chromatograph from operating. Any small degradation of the performance of the pumping system caused by bubbles is highly undesirable and must be eliminated by sufficiently degassing the solvents so that cavitation within the pumping system does not occur. For this reason, a low flow restriction in each of the proportioning valve system, the degassing chamber, and connection tubing is desired.

In the case of high pressure mixing HPLC, two or more high pressure pumps are typically used with a variable pumping rate to form a predetermined mixture of solvents at a Tee junction upstream from the injection system and HPLC column. Since such solvent mixing occurs at the outlet of the pumps, the system pressure is sufficiently high to prevent bubble formation at the mixing point or through the HPLC separation column. Degassing solvent supplied to these HPLC systems ahead of each pump may be used to eliminate cavitation during the intake stroke of the pump and to eliminate outgassing in a detector operating downstream from the outlet of the HPLC column.

In addition to preventing cavitation in both high-pressure and low-pressure mixing type HPLC systems, mobile phase degassing may also prevent undesired effects at the detector. Mass spectrometric detection requires a smooth, continuous flow of solvent into the nebulizer, which solvent flow can be interrupted by bubbles exiting the column when the solvent is improperly degassed. Moreover, detection of fluorescent compounds eluting from the HPLC column can be quenched by the presence of oxygen in the mobile phase. Background absorbance of solvents such as alcohols, tetrahydrofuran and others can interfere with accurate analyte assessment, and such background absorbance may be mitigated by reducing the concentration of oxygen in the mobile phase to a constant value. In analyses wherein the amount of oxygen present in the system affects detection, control of the concentration of dissolved oxygen to a constant value is beneficial.

Liquid degassing utilizing tubular gas/liquid separation membrane structures for conducting fluid through a degassing chamber have been described previously in, for example, U.S. Pat. Nos. 6,248,157, 6,309,444, 5,885,332, 6,675,835, 7,713,331, 6,949,132, and 6,494,938, assigned to the present assignee and herein incorporated by reference.

While conventional liquid degassing systems employing a semi-permeable membrane are available, there remains a need, particularly with devices associated with liquid chromatography, to provide a fluid degassing capability wherein the combined elements of the degassing system offer low flow restriction, high efficiency, small size and low cost with a reduced footprint when placed within an HPLC instrument. Shortcomings in the prior art have been overcome in the present invention by using a fluid flow distribution arrangement to distribute fluid substantially uniformly across a gas permeable membrane. As it is desirable that the restriction to flow be as low as possible, the relationship between elements along the fluid flow path be arranged such that fluid distribution across the entire surface of the membrane may be substantially uniform at all design flow rates.

A gas-liquid contactor as it is commonly applied in the field of High Pressure Liquid Chromatography (HPLC) or Liquid Chromatography (LC) is configured such that a first side of an inert, gas permeable membrane is in contact with an HPLC mobile phase (mobile phase) comprised of a solvent, or a mixture of solvents, while the opposite, second side of the membrane is in contact with a gas that may be at reduced atmospheric pressure (a vacuum). The function of the membrane is to allow diffusion of atmospheric gas dissolved in the mobile phase into the permeate side of the membrane in a manner consistent with Henry's law and Dalton's law wherein the membrane itself behaves according to Fick's law of diffusion. Of particular interest in the field of HPLC mobile phase degassing is the role of the membrane in selectively allowing atmospheric fixed gasses such as oxygen, nitrogen and carbon dioxide which may be dissolved in the mobile phase to pass through the membrane while restricting the movement of the desired liquid components of the mobile phase from passing through the membrane. Such restriction of movement is commonly referred to as the selectivity of the membrane. It is therefore desirable to select a membrane material which allows the passage of these fixed gasses to the exclusion of the liquid components of the mobile phase.

Fluid degassing in HPLC applications has most predominantly been accomplished through the use of tubular membranes and tubular membrane bundles that convey the mobile phase through their lumens in a reduced atmospheric pressure (vacuum) environment, so that gaseous species within the conveyed fluid is promoted to pass through the luminal walls of the tubular membranes. Such tubular membranes, however, have limitations in their wall thickness, which limits degassing capabilities. Moreover, potting of tubular membranes and tubular membrane bundles can be difficult. In high-flow regimes, flat sheet form membranes may be preferred for their thinness and ease of application.

Though flat-sheet form membrane degassing devices have been proposed, it has been found by the Applicant that conventional configurations fail to fully take advantage of the performance that flat film-form membrane degassing offers. In particular, typical approaches fail to establish a uniform fluid flow field in contact with the membrane, wherein such flow field has a minimal depth to facilitate thorough fluid-membrane contact.

It is therefore an object of the present invention to provide a gas/liquid membrane contactor that yields superior degassing performance in a minimized volume.

SUMMARY OF THE INVENTION

The present invention preferably utilizes gas permeable, liquid impermeable, and non-porous substantially planar membranes which operate when coated with a fluid by the general solution-diffusion mechanism to remove dissolved atmospheric gasses from liquids in a mechanism commonly referred to as degassing or deaeration. The degassing device described comprises a permeate chamber, a porous support mesh, a permeable chemically inert planar membrane and a fluid distribution chamber bound together utilizing known mechanisms such as screws, rivets, welding, bonding or press-fitting and the like with sufficient force to effect the seal between the O-ring, the membrane and the components of the contactor.

A liquid degassing apparatus of the present invention includes a module having a semi-permeable membrane disposed in a chamber and dividing the module into a permeate side and a retentate side, with the permeate side including a first port. The retentate side includes an inlet liquid manifold fluidically connected to an inlet port and configured to exert a first frictional flow restriction upon a liquid flow therethrough. The permeate side further includes an outlet liquid manifold fluidically connected to an outlet port, and configured to exert a second frictional flow restriction upon the liquid flow therethrough. A channel array is provided at the permeate side including a plurality of channels extending between and fluidically connecting the inlet and outlet liquid manifolds. The channels are separated from one another by respective dividers, wherein each of the channels is configured to exert a channel frictional flow restriction upon a liquid flow therethrough. A sum of the first and second frictional flow restrictions is no greater than about 50% of a sum of the channel frictional flow restrictions.

A degassing apparatus of the present invention includes a module having a first plate connected to a second plate to define a degassing chamber therebetween, and a semi-permeable membrane secured between the first and second plates to separate the chamber into a permeate side and a retentate side. The first plate includes a fluid flow path defined by a first manifold, a second manifold, and a first channel array having a plurality of first channels fluidically connecting the first manifold to the second manifold, wherein the fluid flow path is configured to convey a fluid flow through the retentate side of the chamber an into contact with the membrane. The first manifold is configured to exert a first frictional flow resistance upon the fluid flow, and the second manifold is configured to exert a second frictional flow resistance upon the fluid flow. Each of the channels in the channel array are configured to exert a substantially equal channel frictional flow resistance upon the fluid flow, wherein a sum of the first and second frictional flow restrictions is suitable to permit substantially uniform fluid flow along the channel array while in contact with the membrane. The permeate side of the chamber is evacuatable through a first port.

A method for reducing a target gas concentration in a fluid includes providing the module, and motivating the fluid along the fluid flow path in contact with the semi-permeable membrane, and reducing a partial pressure of the target gas in the permeate side of the chamber to a level that is lower than the target gas partial pressure in the fluid.

A gas-liquid contactor includes a module having a chamber separated into a first portion and a second portion by a semi-permeable membrane that may be substantially planar. The module includes an inlet and an outlet to permit fluid flow through the first portion of the chamber, and the module has a shape profile that is suitable to provide the fluid flow with a uniform membrane contact opportunity.

A gas-liquid contactor of the present invention includes a module having a chamber separated into a first portion and a second portion by a semi-permeable membrane that may be substantially planar. The module includes an inlet and an outlet to permit fluid flow through the first portion. The module includes a shape profile defining a fluid flow path through the first portion of the chamber, wherein the fluid flow path includes a first flow field, a second flow field, and a third flow field together fluidically connecting the inlet to the outlet. The first flow field has a first flow depth that is greater than a second flow depth of the second flow field.

BRIEF DESCRIPTION OF THE DRAWINGS

FIG. 2B is a bottom perspective view of a degassing module of the present invention;

DETAILED DESCRIPTION OF THE PREFERRED EMBODIMENTS

Figure 1:
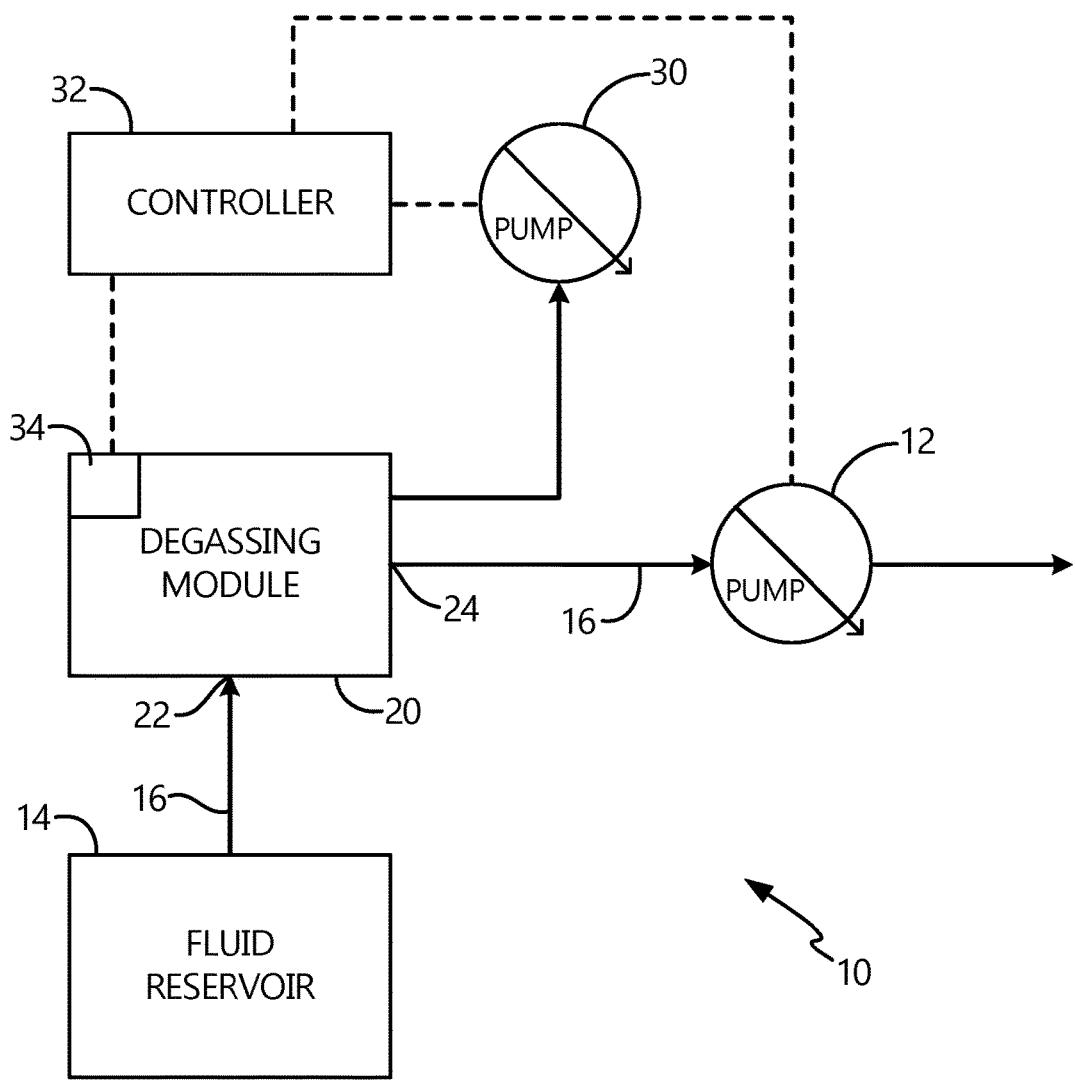
FIG. 1 is a schematic illustration of a fluid degassing system of the present invention.

The objects and advantages enumerated above together with other objects, features, and advances represented by the present invention will now be presented in terms of detailed embodiments described with reference to the attached drawing figures which are intended to be representative of various possible configurations of the invention. Other embodiments and aspects of the invention are recognized as being within the grasp of those having ordinary skill in the art.

A fluid degassing device as described herein includes a module that defines an interior chamber, wherein a substantially flat sheet-form membrane is positioned to separate the chamber into a permeate side and a retentate side. The retentate side of the chamber is configured for fluid-membrane contact along a fluid flow path between an inlet and an outlet of the module. A degassing environment may be established at the permeate side of the chamber to develop a driving force for target gas to be transported through the membrane from the fluid. The degassing environment may be at reduced atmospheric pressure as the result of a pump evacuating the permeate side of the chamber through an evacuation port in the module.

For the purposes hereof, the term "fluid" means any material capable of flow under force, including a liquid, a gas, and combinations thereof. The fluid is preferably guided along a fluid flow path through the degassing module of the present invention along channels, troughs, and other structures that define at least partial boundaries to the fluid flow.

A schematic illustration of a fluid degassing system 10 of the present invention may be employed to remove gas from a fluid flow, such as in the case of a mobile phase in liquid chromatography. In this example basic system, a fluid pump 12 delivers fluid from fluid reservoir 14 along a delivery path 16 to a degassing module 20. As described hereinbelow in greater detail, degassing module 20 includes one or more membranes for separating gas from liquid contained in the fluid. The fluid delivery flow path 16 directs fluid through a fluid inlet 22 of degassing module 20, and thence along a degassing fluid flow path through degassing module 20 to fluid outlet 24. Treated fluid, which may be a liquid, or reduced gas concentration fluid, is output to downstream equipment appropriate for the application, such as an injection valve, chromatographic column, and other chromatographic equipment.

Degassing system 10 may include a vacuum pump 30 for evacuating a permeate side of a chamber within degassing module 20. Vacuum pump 30 is fluidly connected to a port 26 in degassing module 20 that opens to the permeate side of the chamber. A controller 32 may be communicatively coupled to one or both of vacuum pump 30 and fluid pump 12, as well as to a pressure sensor 34 in the permeate side of the chamber within degassing module 20. Pressure sensor 34 is capable of sending a signal to controller 32 to adjustably operate one or more of vacuum pump 30 and fluid pump 12 to achieve a desired balance of fluid flow rate and permeate side environment in degassing module 20.

Figure 2A:
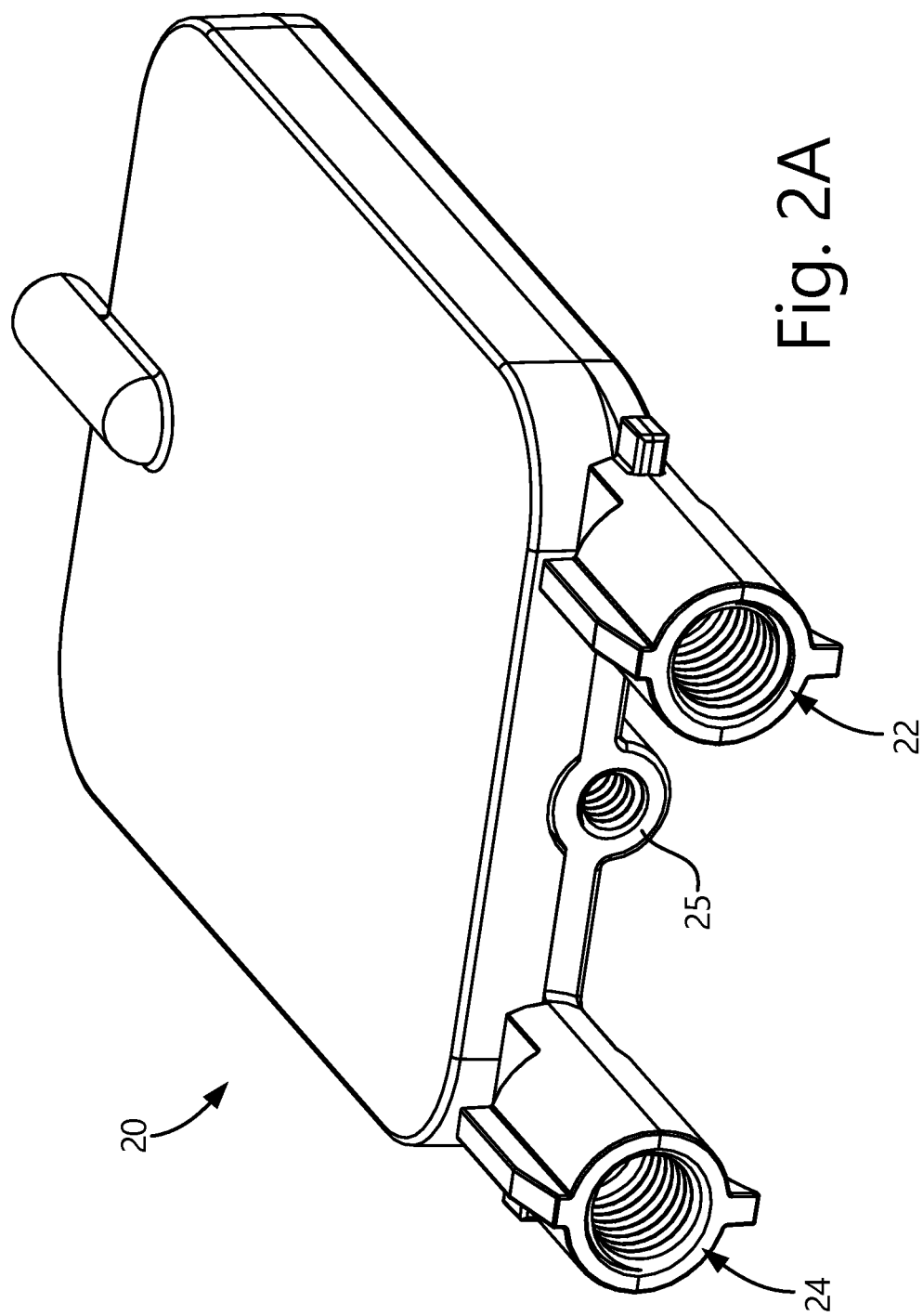
FIG. 2A is a top perspective view of a degassing module of the present invention.

An example embodiment of a degassing module 20 of the present invention is illustrated in FIG. 2. Fluid degassing module 20 may be arranged as a flow-through device with liquidous fluid inlet 22 and liquidous fluid outlet 24. Port 26 may be fluidically connected to a pump, such as vacuum pump 30, for evacuating a permeate side of a chamber within degassing module 20. A threaded receptacle 25 may be useful in mounting degassing module 20 within a system such as degassing system 10.

Figure 3A:
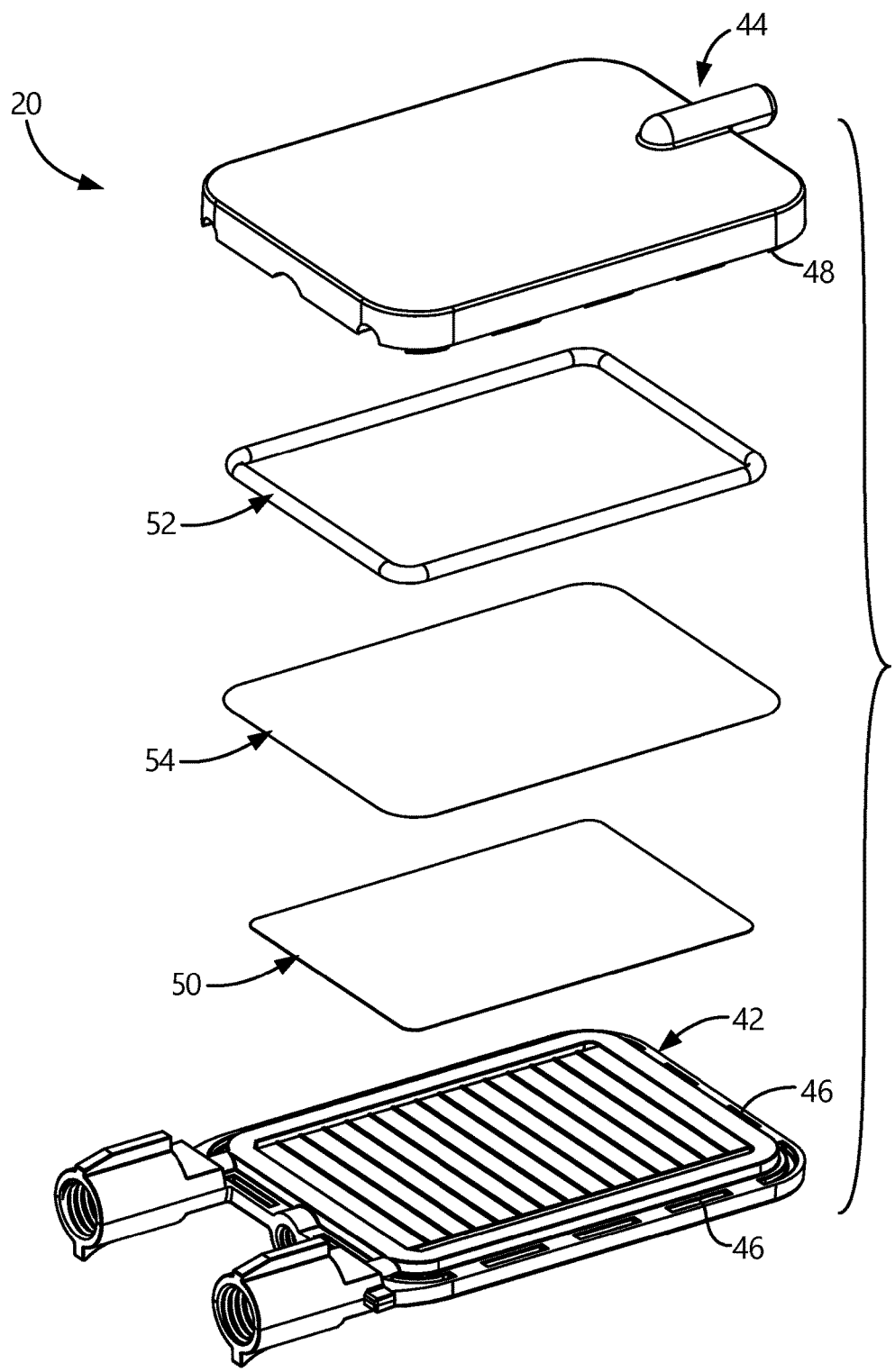
FIG. 3A is an exploded top perspective view of a degassing module of the present invention.
Figure 3B:
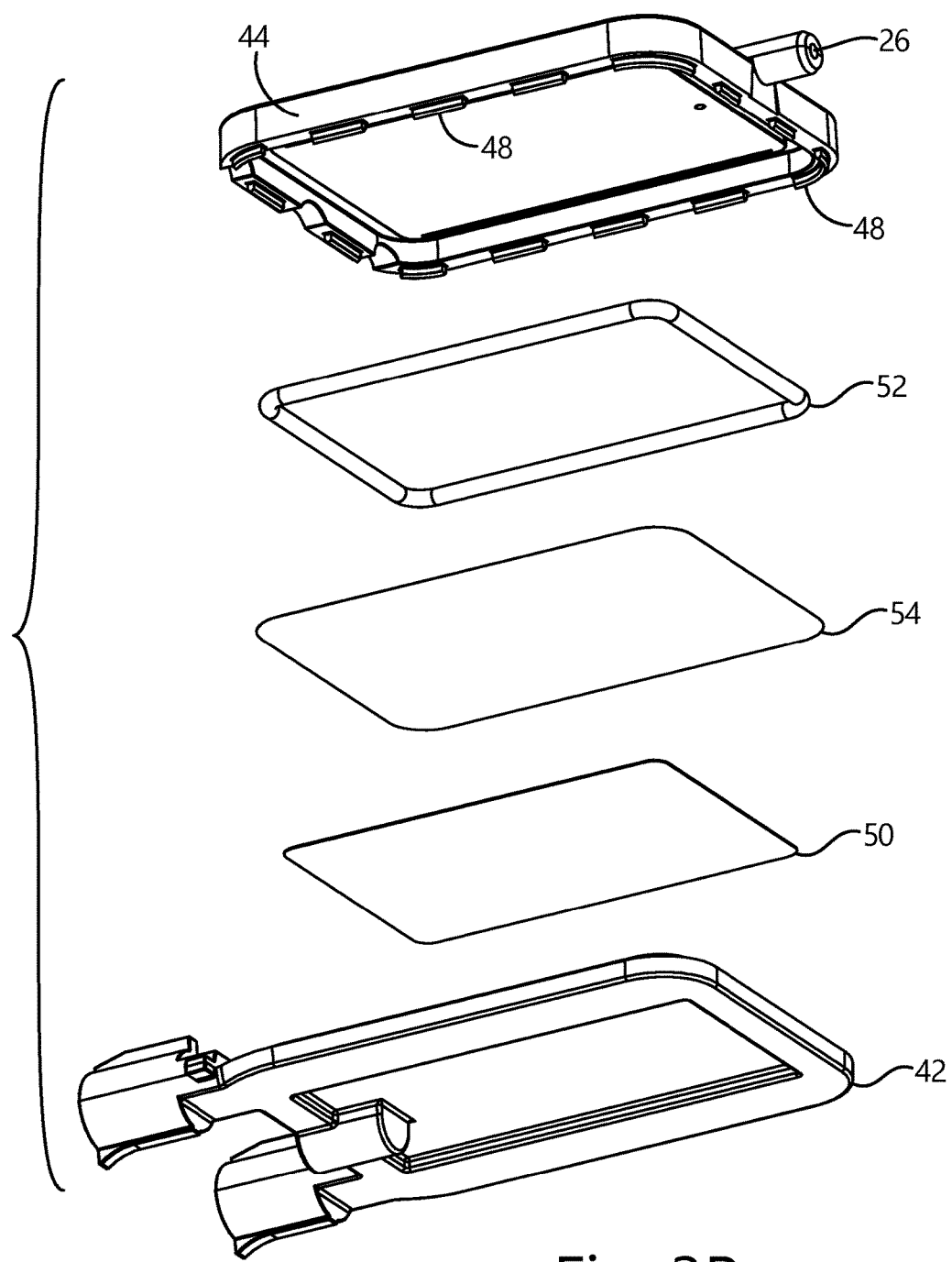
FIG. 3B is an exploded bottom perspective view of a degassing module of the present invention.

An exploded view of degassing module 20 is illustrated in FIGS. 3A-3B, wherein degassing module 20 includes a first plate 42 and a second plate 44 that may be connected together to define a degassing chamber therebetween. Degassing module 20 further includes a semi-permeable membrane 50 that may be secured in the chamber between first and second plates 42, 44 with a gasket 52, such as an O-ring configured to establish a fluid-tight seal for membrane 50 in the chamber. In some embodiments, gasket 52 establishes a fluid-tight seal about a perimeter of membrane 50, as will be described in greater detail hereinbelow. Degassing module 20 may optionally further include a diffuser element 54 that is porous to permit gas removed from the fluid to pass through the body of diffuser element 54, and out through port 26 of second plate 44. Diffuser element 54 may also act to secure membrane 50 in the chamber, including by urging membrane 50 into contact with first plate 42.

In some embodiments, first plate 42 may include a series of mounting receptacles 46 that are configured to receive mounting tabs 48 of second plate 44 to aid in locating and securing second plate 44 to first plate 42. It is envisioned that one or more of a variety of securement techniques may be employed to secure second plate 44 to first plate 42 to establish a chamber in which membrane 50, gasket 52, and diffuser element 54 may be operably disposed. Example such securement techniques may include fastening, soldering, welding, ultrasonic welding, adhesives, melt boding, and the like. Typically, first and second plates 42, 44 are manufactured from one or more chemically inert materials, such as stainless steel and chemically inert polymer materials. The materials used in the manufacture of first and second plates 42, 44 may dictate the appropriate technique for securing second plate 44 to first plate 42. It will be appreciated that the materials selected for first and second plates 42, 44 should likely be compatible with one another for appropriate bonding and life cycle considerations First plate 42 defines a fluid flow path 60 for contact between the fluid flow and membrane 50. Preferably, fluid flow path 60 optimizes fluid contact with the available membrane contact surface area. Conventional degassing systems may seek and even obtain sufficient fluid-membrane contact to achieve a desired degassing performance, but fail to optimize fluid-membrane contact through specific physical configuration criteria that enable, for example, degassing unit size reduction, fluid flow rate increase, reduced membrane permeance, and the like, without degassing performance degradation. In the illustrated embodiment, fluid flow path 60 is defined by a first flow field 62, a second flow field 64, and a third flow field 66, wherein fluid flows sequentially through first, second, and third flow fields 62, 64, 66. In some embodiments, second flow field 64 may include a first channel array of a plurality of first channels 65 that fluid connect first flow field 62 to third flow field 66. First flow field 62 may include a trough or manifold that is fluidically connected with liquidous fluid inlet 22 for distributing fluid flow among the first channels 65. Likewise, third flow field 66 may include a trough or manifold for collecting fluid flow from second flow field 64, and conveying the collected fluid flow along fluid flow path 66 through liquidous fluid outlet 24.

Figure 7:
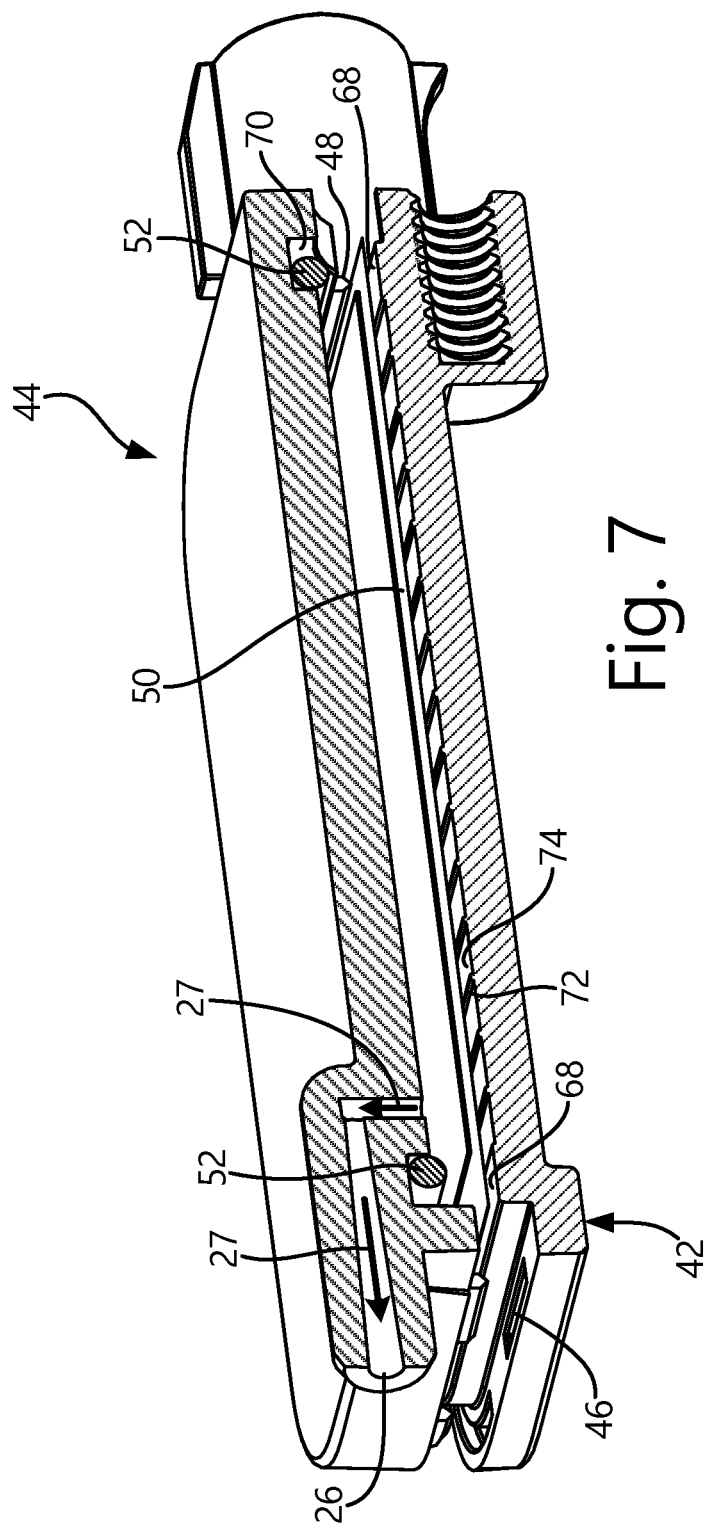
FIG. 7 is a cross-sectional exploded perspective view of a portion of a degassing module of the present invention.
Figure 8:
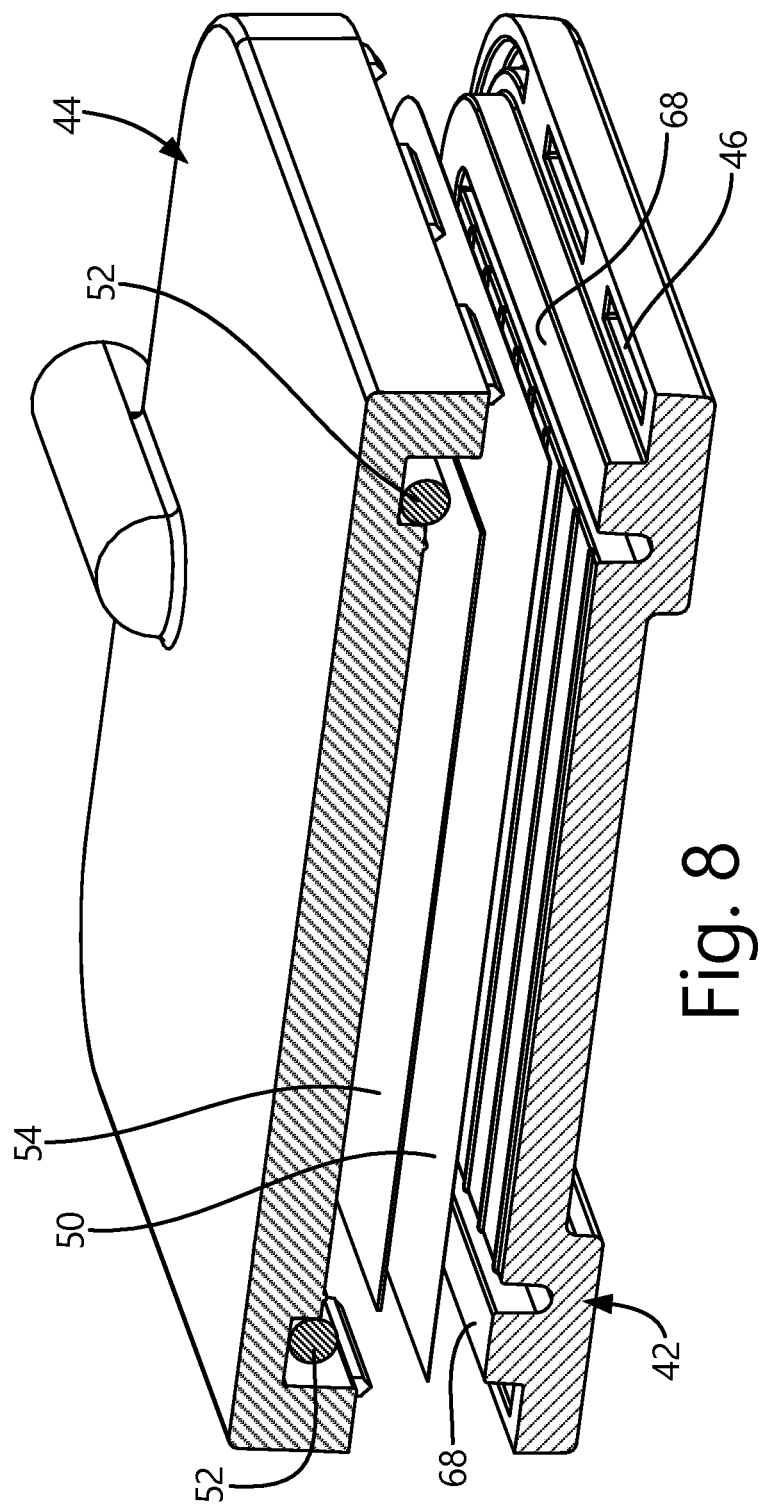
FIG. 8 is a cross-sectional exploded perspective view of a portion of a degassing module of the present invention.
Figure 9:
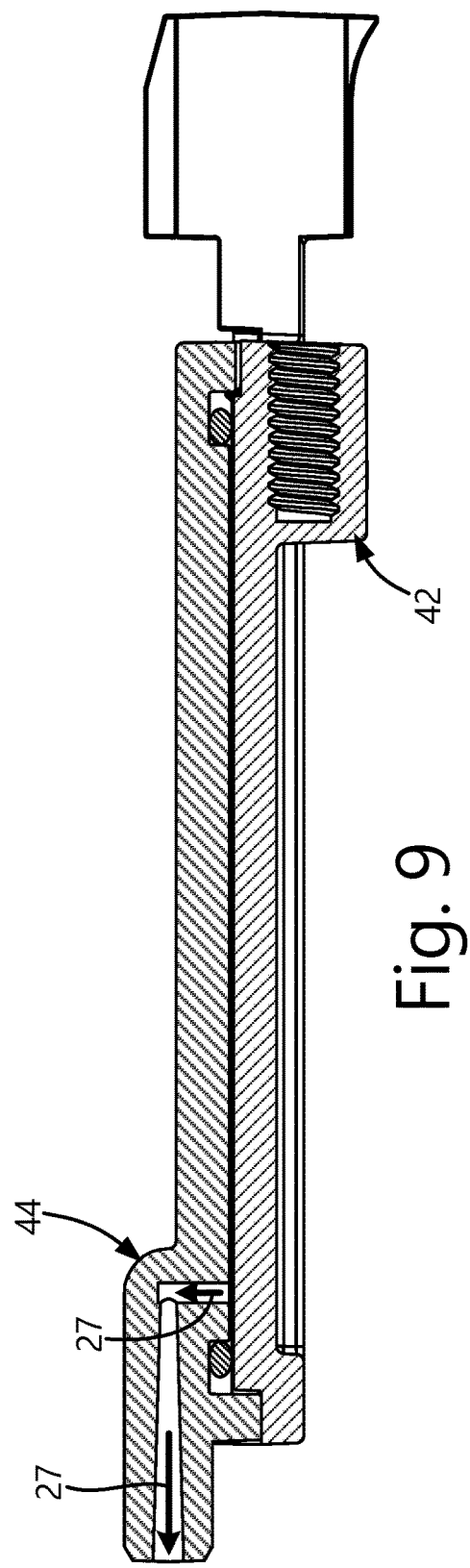
FIG. 9 is a cross-sectional side view of a degassing module of the present invention.
Figure 10A:
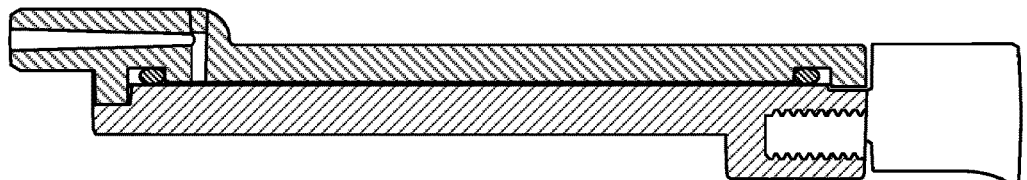
FIG. 10A is a cross-sectional side view of a degassing module of the present invention.
Figure 10B:
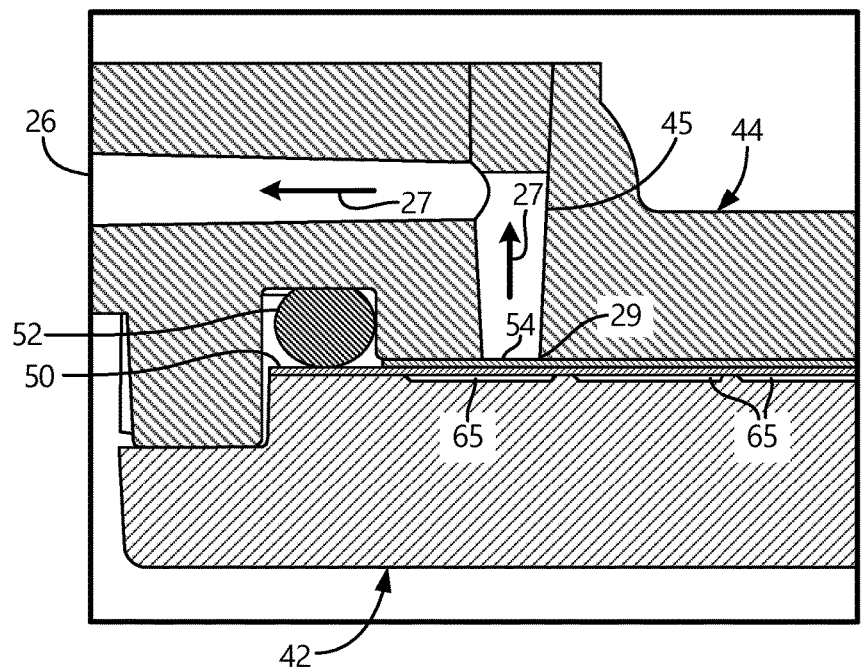
FIG. 10B is a cross-sectional view of a portion of the degassing module illustrated in FIG. 10A.

As shown in FIG. 7, first plate 42 may further include a perimeter brace surface 68 upon which membrane 50 may be sealingly secured through the connection of second plate 44 to first plate 42. Second plate 44 may include an annular or peripheral recess 70 in which gasket 52 may be retained. Connection of second plate 44 to first plate 42 with mounting tabs 48 of second plate 44 being received in mounting receptacles 46 causes gasket 52 to press membrane 50 against perimeter brace surface 68 of first plate 42. Preferably, such pressing force is sufficient to fluidically seal membrane 50 between gasket 52 and perimeter brace surface 68 of first plate 42. Various views of such assembly are provided in the drawings.

The sealing assembly of membrane 50 between gasket 52 and perimeter brace surface 68 of first plate 42 is analogous to ASTM method D1434, which is typically employed in the testing of membrane permeability. As described in ASTM D1434, it is desired to seal the membrane to prevent movement of fluid around the periphery of the membrane. In sealing gasket 52 between first and second plates 42, 44, gasket 52 may be compressed between annular/peripheral recesses 70 of second plate 44 and a perimeter portion of membrane 50. Gasket 52 may be considered an "O-ring" of resilient material for sealingly engaging membrane 50. An example gasket 52 useful in degassing module 20 of the present invention may be a PFTE O-ring Second plate 44 may include a first port 26 along a gas exhaust path 27, which may be provided as a bore through second plate 44 between first port 26 and a chamber region 29 of second plate 44. In this arrangement, gas permeated through membrane 50 may be exhausted along gas exhaust path 27, and out from degassing module 20. In some embodiments, vacuum pump 30 may provide the driving force for the exhaustion of permeated gas along gas exhaust path 27. Removal of permeated gas maintains an environment at a permeate side of the chamber that promotes gas transfer from the fluid in fluid flow path 60 through semipermeable membrane 50.

In some embodiments, a diffuser element 54 may be operably positioned between second plate 44 and membrane 50. Diffuser element 54 may, in some cases, be operably positioned between chamber region 29 of second plate 44 and membrane 50 in order to both assume at least a portion of a void space between membrane 50 and chamber region 29 of second plate 44, and to urge membrane 50 against a portion of first plate 42. Diffuser element 54 is preferably a porous structure that provides pathways for permeating gasses to pass through and along diffuser element 54 toward bore 45 in second plate 44. Diffuser element 54 may also act to prevent substantial movement of membrane 50 toward second plate 44 under the action of significant differential pressure among the retentate (fluid) side and permeate (gas) side of membrane 50. By assuming void volume between second plate 44 and membrane 50, diffuser element 54 assists in maintaining membrane 50 in place in a desired substantially planar configuration. This function may also act to inhibit damage to membrane 50 caused by deflection toward a low-pressure permeate-side environment. Diffuser element 54 preferably exerts very little flow restriction to permeate gas flow therethrough, and preferably less than 1 mm Hg flow restriction to the permeate gas. Diffuser element 54 may be fabricated from a variety of materials in a variety of configurations, while still performing the above-described functions. Diffuser element 54 is preferably chemically inert and porous, and may, in some embodiments, include a woven or mesh construction. Example materials useful in a construction of diffuser element 43 include polymers, stainless steel, glass, ceramics, and other non-reactive, inert materials. An example diffuser element 54 is a woven polyether ether ketone (PEEK) fabric available from Sefar AG of Heiden, Switzerland.

Diffuser element 54 may be located and positioned in place between second plate 44 and membrane 50 by gasket 52. In some embodiments, gasket 52 forms a perimeter boundary for diffuser element 54, wherein diffuser element 54 is positioned completely within a boundary defined by gasket 52. In such embodiments, diffuser element 54 may or may not be secured to second plate 44 through adhesives, welding, or the like. In other embodiments, at least a portion of diffuser element 54 may be secured between gasket 52 and membrane 50, or between gasket 52 and first plate 42 or second plate 44. In such arrangements, diffuser element 54 may act as an "air bleed", wherein a restricted flow of environmental gases, such as air, may be drawn into the permeate side of the chamber through the portion of diffuser element 54 that is exposed to the environment. In the case that diffuser element 54 is completely contained within an inner boundary of gasket 52, the permeate side of the chamber is substantially completely sealed from an external environment. On the other hand, with diffuser element 54 interposed between gasket 52 and a sealing surface of the apparatus, the porous structure of diffuser element 54 may permit restricted gas inflow into the permeate side of the chamber. Certain applications for degassing module 20 may utilize such an air bleed characteristic to, for example, diminish solvent vapor accumulation in the permeate side of the chamber, as well as to minimize or eliminate solvent vapor formation and passage to the evacuation pump 30.

Membrane 50 is preferably "semi-permeable", in that it is substantially impermeable to liquids while being permeable to gasses. In some preferred embodiments, membrane 50 is nonporous, and permits component transport therethrough by a solution diffusion mechanism, rather than a Knudsen diffusion mechanism through a mean free path. Membrane 50 may be fabricated by one or more materials, including in one or more layers, or in composite form. Example membrane materials useful in the manufacture of semi-permeable membrane 50 include silicone rubbers, polytetrafluoroethylene, amorphous fluoropolymers (such as Teflon® AF from E.I. du Pont de Nemours and Company of Wilmington, Del.), and other polymer and non-polymer materials. A particular example membrane material useful in the manufacture of membrane 50 is described in U.S. patent application Ser. No. 13/911,433, assigned to the present Assignee and herein incorporated by reference.

Membrane 50 may be substantially planar, and configured and positioned to maximize contact surface area for contact with the fluid being conveyed along fluid flow path 60. Thus, in preferred embodiments, membrane 50 is substantially planar. It is contemplated, however, that more than one substantially planar membranes 50 may be utilized in degassing module 20 of the present invention. Moreover, non-planar, including tubular semi-impermeable membranes may be employed in place of, or in addition to, substantially planar membranes 50. In one example, a substantially planar "bed" of one or more tubular semi-permeable membranes may be used in degassing module 20 in place of, or in addition to, a substantially planar, sheet form membrane film. In general, therefore, it is contemplated that various separation membrane shapes and arrangements may be employed for contact with the fluid along fluid flow path 60 to desirably degas the flowing fluid.

First plate 42 preferably defines a fluid flow path 60 that enhances degassing efficiency in comparison to conventional fluid degassing systems. In particular, the arrangement of first plate 42 in defining fluid flow path 60 ensures substantially uniform fluid flow distribution to most efficiently utilize the available contact surface area of membrane 50. In that regard, first and third flow fields 62, 66 are configured to exert a substantially lower frictional flow restriction than that exerted by second flow field 64. Because of the significantly different frictional flow restrictions, fluid will flow relatively freely along first flow field 62 so as to substantially uniformly distribute fluid across all of first channels 65 of the first channel array making up second flow field 64. In addition, second flow field 64 may preferably be configured so as to exert a substantially uniform frictional flow restriction between first and third flow fields 62, 66. As a consequence, fluid flow is distributed substantially uniformly throughout second flow field 64 in order to substantially uniformly contact membrane 50.

Figure 4:
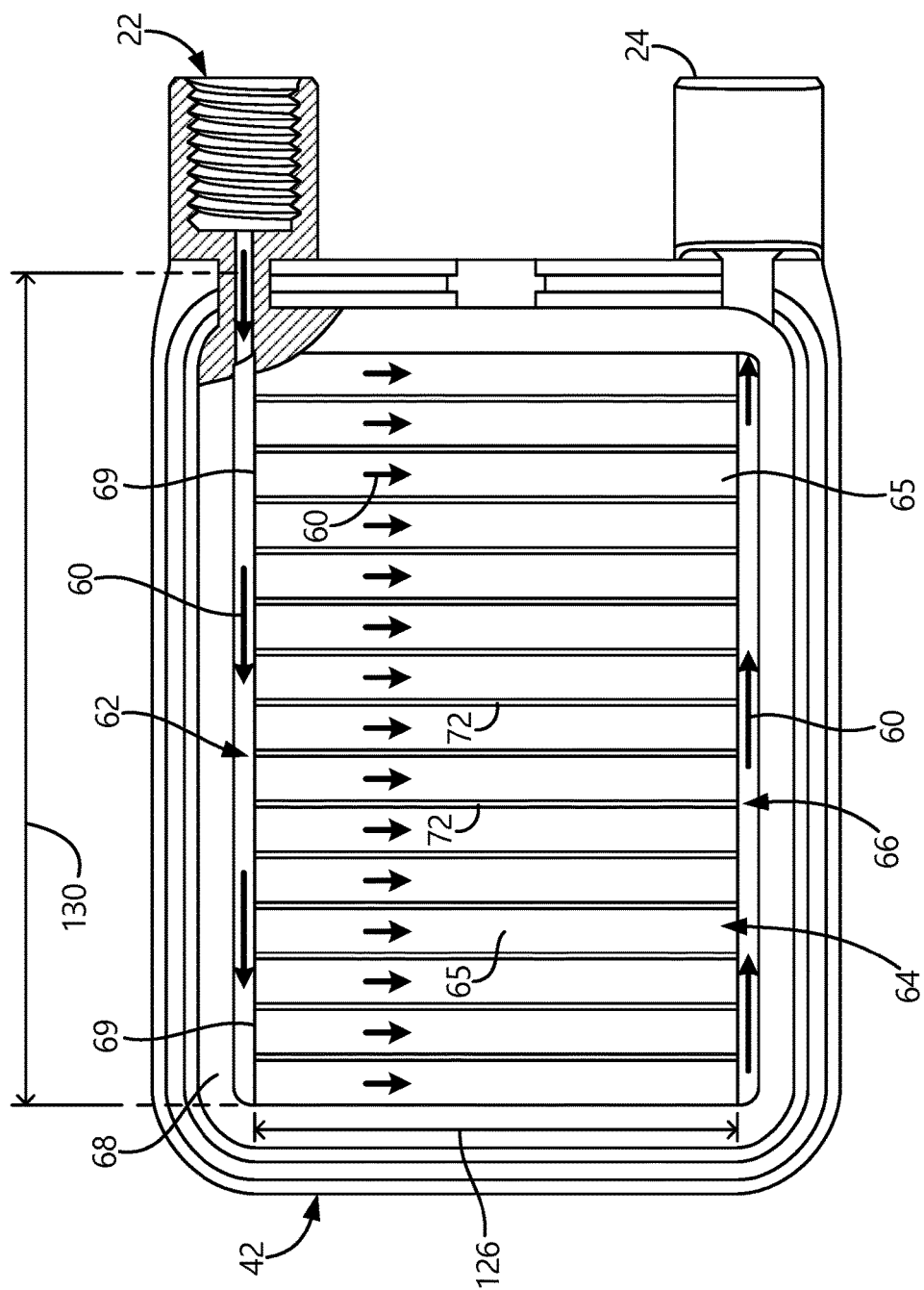
FIG. 4 is a partial cut-away top view of a portion of a degassing module of the present invention.

In the embodiment illustrated in FIG. 4, membrane 50 may be operably positioned to superimpose an area bounded by perimeter brace surface 68, which includes at least a portion of flow fields 62, 64, 66. In some embodiments, membrane 50 is positioned for fluid contact at substantially all of first, second, and third flow fields 62, 64, 66. In other embodiments, membrane 50 may cover substantially the entirety of second flow field 64. In still further embodiments, membrane 50 may be positioned for fluid contact at portions of first and/or third flow fields 62, 66, and substantially an entirety of second flow field 64.

First flow field 62 may include a trough or manifold fluidically connected to liquidous fluid inlet 22, and may include a first height 112 and a first width 114, which are components of a first hydraulic diameter for first flow field 62. In the case of a non-circular cross-section flow zone, a hydraulic diameter represents the equivalent diameter of a round pipe which yields the same force balance as that for the non-circular duct at issue. It is contemplated that any or all of flow fields 62, 64, 66 may have non-circular cross-sections, whereby the respective hydraulic diameters are appropriate for considering fluid flow dynamics therethrough. As can be seen from the illustrated example embodiments, first and third flow fields 62, 66 may be substantially deeper than a second depth 122 of first channel 65. Depth of the fluid duct is a component in determining overall frictional fluid flow restriction, wherein the relatively large first depth 112 of first flow field 62 is a component aiding the relatively low frictional restriction to fluid flow therethrough.

Third flow field 66 may be substantially identical, similar, or dissimilar to first flow field 62. In the illustrated embodiment, third flow field 66 includes a trough or duct of substantially similar configuration and dimension to that of first flow field 62. A variety of configurations and dimensions for first and third flow fields, however, are contemplated by the present invention. Second flow field 64 may include a first channel array of a plurality of first channels 65 fluidically connecting first flow field 62 to third flow field 66. First channels 65 may be separated from one another by respective dividers 72 that may extend integrally with first plate 42 at least partially between first and third flow fields 62, 66. Dividers 72 may be in the form of walls or raised ribs extending upwardly from first channel base 74 by a first channel height dimension 122. As such, the extent to which dividers 72 extend from first channel base 74 may define a first channel height dimension 122. First channel base 74 may include a surface of first plate 42 and/or a separate material layer at first plate 42. Such a separate material layer may include a coating, film, plate, or the like that is positioned at first plate 42 such that the fluid flows in contact with the separate material layer at second flow filed 64, instead of in contact with first plate 42. In such embodiments, dividers 72 may be integrally formed with, or secured to the separate material layer, or may instead be formed integrally with or separately attached to first plate 42, with the separate material layer being disposed between dividers 72. Membrane 50 may be provided with dividers 72 on at least to side facing first plate 42. Such dividers 72 provided with membrane 50 may be utilized alone or in combination with any dividers 72 at first plate 42 in order to direct fluid flow at second flow field 64.

Dividers 72 may extend continuously or discontinuously between first and third flow fields 62, 66. Dividers 72 may each extend in parallel continuously between first and third flow fields 62, 66 in order to establish a plurality of straight and parallel first channels 65 oriented substantially perpendicularly to each of first and third flow fields 62, 66. In such embodiments, fluid flow path 60 is distributed from first flow field 62 substantially at a right angle into second flow fields 64, and thence substantially along a right angle into third flow field 66.

It is to be understood, however, that a variety of arrangements and configurations for dividers 72 and first channels 65 may be utilized to accomplish the desired fluid flow dynamics of the present invention. Second flow filed 64 may be preferably configured to exert a substantially uniform frictional flow restriction throughout. In order to accomplish substantially uniform frictional fluid flow restriction, each of first channels 65 may exert a substantially equal frictional fluid flow restriction. Each of first channels 65 may therefore have a substantially identical profile, including substantially identical channel height dimensions 122, first channel width dimensions 124, and first channel length dimensions 126. As will be appreciated in the discussion of frictional fluid flow restriction hereinbelow, equivalent first channel profiles results in uniform flow restriction. One approach to accomplishing substantially uniform frictional fluid flow restriction at second flow field 64 is with a channel array of a plurality of first channel 65 having substantially equivalent shape and length profiles.

First channel 65 may have inequal profiles (length and cross-sectional shape), so long as the frictional fluid flow restriction exerted by the respective first channel 65 is substantially equal. Limitations to inequal first channel profiles, however, may be envisioned where total degassing efficiency of degassing module 20 is paramount. For example, increasing first channel depth 122 to accommodate other flow restriction factors in a first channel 65 may reduce the degassing efficiency for fluid passing through that increased depth first channel 65. It is understood through fluid dynamics that minimizing the fluid depth (first channel depth 122) increases opportunity for fluid/membrane contact, wherein membrane 50 is positioned to define fluid flow channels at a retentate side between membrane 50 and first plate 42. Decreasing first channel depth 122 correspondingly increases frictional fluid flow restriction along first channel 65. Thus, a balance must be struck between minimizing first channel depth 122, and controlling the frictional fluid flow restriction at second flow field 64. The frictional fluid flow restriction through degassing module 20, which may be primarily controlled by the frictional fluid flow restriction at second flow field 64, is preferably less than the vapor pressure of the highest vapor pressure fluid component in the fluid flow. The total frictional fluid flow restriction of degassing module 20 may more preferably be less than the vapor pressure of the highest vapor pressure fluid component, so as to accommodate for frictional flow restrictions in other components of the fluidics system (such as the HPLC system). Nevertheless, a principle of the invention is the design of fluid flow path 60 through degassing module 20 to minimize first channel depth 122 without violating the above relationship. In this manner, with minimized first channel depth 122, degassing efficiency may be maximized.

It is contemplated that first channel 65 need not be in an array of substantially identical, parallel first channels. Rather, dividers 72 are preferably configured and arranged to establish a substantially uniform fluid/membrane contact opportunity for all fluid passing through second flow field 64. A uniform fluid/membrane contact opportunity may be defined as a substantially equal amount of time that fluid may be in contact with membrane 50, regardless of the specific path taken through second flow field 64. It is also preferred that second flow field 64 be arranged to ensure fluid/membrane contact with substantially all available contact surface area of membrane 50. By doing so, degassing module 20 may maximize its available degassing performance. Conventional degassing systems, by contrast, may not be configured to ensure full utilization of the separation membrane, and instead permit fluid flow dynamics that either under-utilize fluid/membrane contact opportunity, or miss portions of fluid/membrane contact altogether.

In some embodiments, second flow field 64 may be arranged so that fluid flowing along fluid flow path 60 at second flow field 64 exhibits uniform flow velocity throughout. Such uniform flow velocity may be accomplished in the example embodiment utilizing an array of substantially identical profile first channel 65. In other embodiments, however, flow velocities at different regions of second flow field 64 may be inequal in accordance with inequal frictional fluid flow restriction. In either case, it may be preferred to achieve fluid distribution throughout a membrane contact area available at second flow field 64, while also achieving a substantially uniform fluid/membrane contact opportunity.

Dividers 72 may be in the form of continuous or discontinuous walls or wall segments. In some embodiments the wall segments of dividers 72 may be in the form of columns or other shapes that assist in defining the fluid flow pattern through second flow field 64. In addition to playing a role in the fluid flow pattern at second flow fields 64, dividers 72 may also function to support membrane 50 in a spaced relationship with channel base 65. Such a spaced relationship establishes the fluid flow regime in which fluid/membrane contact for gas/fluid separation is achieved. The depth of fluid in such fluid flow regime may therefore be determined by the height of dividers 72, to define a channel depth 122. So that membrane 50 is maintained in a spaced relationship with channel base 65 throughout second flow field 64, dividers 72 may be dispersed at spaced locations throughout second flow field 64. Spacing of dividers 72 is preferably appropriate to maintain at least a minimum channel depth dimension 122 throughout second flow field 64. In the event that dividers 72 are in the form of discontinuous ribs or divider segments, first channel 65 may not be well defined, and instead may be a more generalized fluid flow area along fluid flow path 60 at second flow field 64. Such an arrangement nevertheless seeks to establish uniform fluid/membrane contact opportunity while maximizing utilization of the membrane contact area at second flow field 64. This may be accomplished with uniform frictional fluid flow restriction throughout second flow field 64, in combination with a substantial differential frictional fluid flow restriction as between second flow field 64 and at least first flow field 62. The frictional fluid flow resistance of each first channel 65 is a function of the viscosity of the fluid passing therethrough combined with the depth of the fluid layer and the length of first channel 65. In some embodiments, dividers 72 may range in height to provide a first channel depth 122 of between about 25-250 micrometers. Dividers 27 may have a uniform height, and may include respective brace surfaces 76 against which membrane 50 may be urged by diffuser element 54, as described above. Brace surfaces 76 may be coextensive with a brace plane 78, such that membrane 50 may be placed against brace surfaces 76 substantially along brace plane 78.

First and third flow fields 62, 66 may be configured to provide a relatively low frictional fluid flow resistance in comparison with the frictional fluid flow resistance exerted on the fluid at second flow field 64. In this manner, fluid flow path 60 along first flow field 62 may be distributed uniformly to the intake portions 69 of each first channel 65. Uniform distribution of fluid flow path 60 to all intake portions 69 of second flow field 64 ensures that the degassing efficiency of module 20 is predictable and reproducible regardless of fluid flow rate.

Calculating flow restrictions at any point along fluid flow path 60 may be accomplished using the Darcy-Weisbach equation:

$$\Delta p = f_D \times \frac{L}{D} \times \frac{\rho V^2}{2} \quad \text{Equation 1 Darcy-Weisbach}$$

Where Δp=pressure drop due to friction
L=length of interior chamber
D=hydraulic diameter of flow track
ρ=density of the fluid
V=mean velocity of the flow
$f_D$=Darcy friction factor Under Laminal flow conditions (Re<2300), which is the typical flow condition in HPLC, the Darcy friction factor $f_D$ and derivation of Δp is:

$$f_D = \frac{64}{Re} = \frac{64\mu}{\rho DV} \qquad \text{Equation 2}$$

$$\Delta p = \frac{64\mu}{\rho DV} \times \frac{L}{D} \times \frac{\rho V^2}{2} = \frac{32\mu LV}{D^2} = \frac{32\mu LQ}{D^2 A}$$

Where A is the flow cross section area,
Q is the volumetric flow rate,
μ is the viscosity of the fluid.

Figure 5:
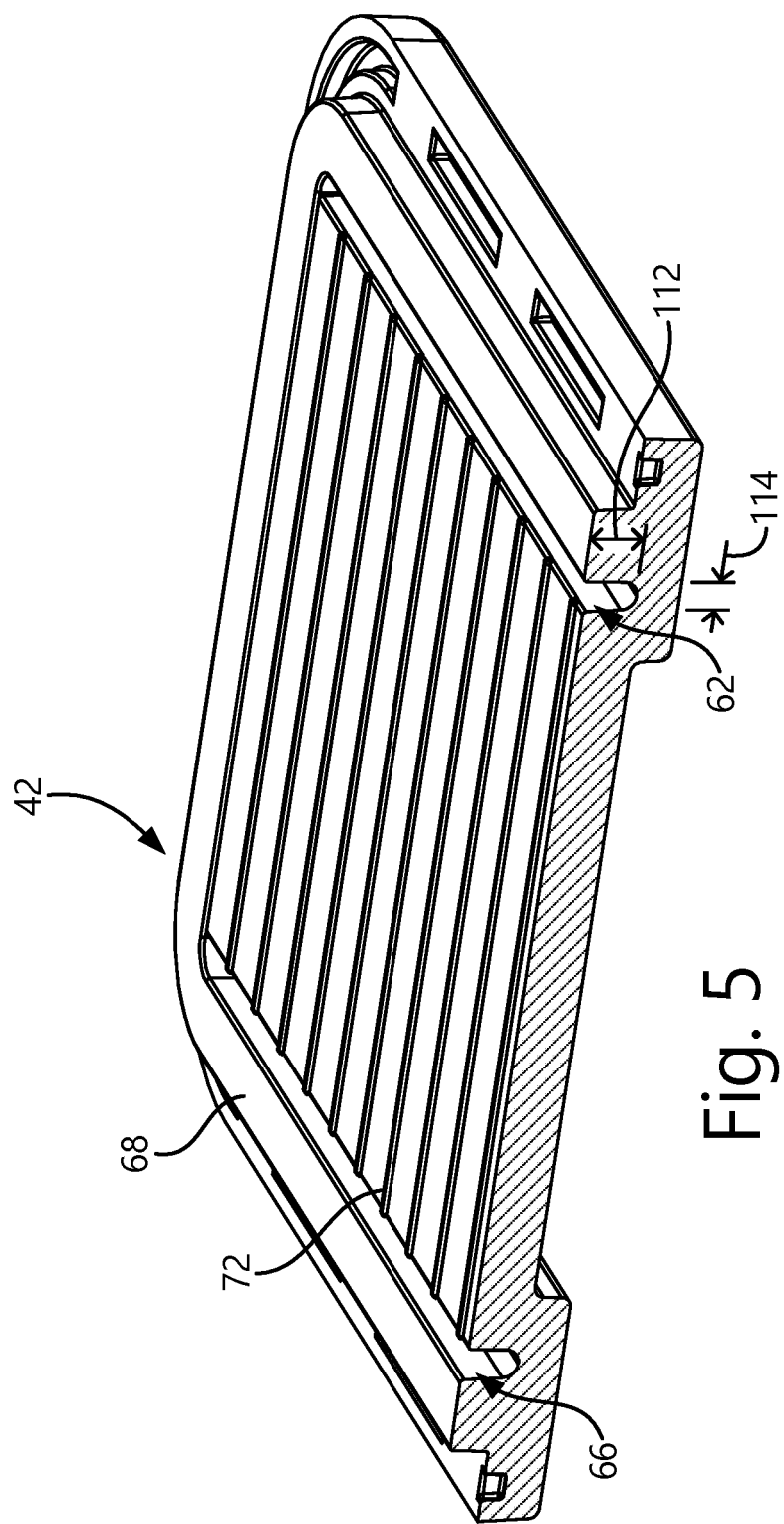
FIG. 5 is a cross-sectional perspective view of a portion of a degassing module of the present invention.
Figure 6:
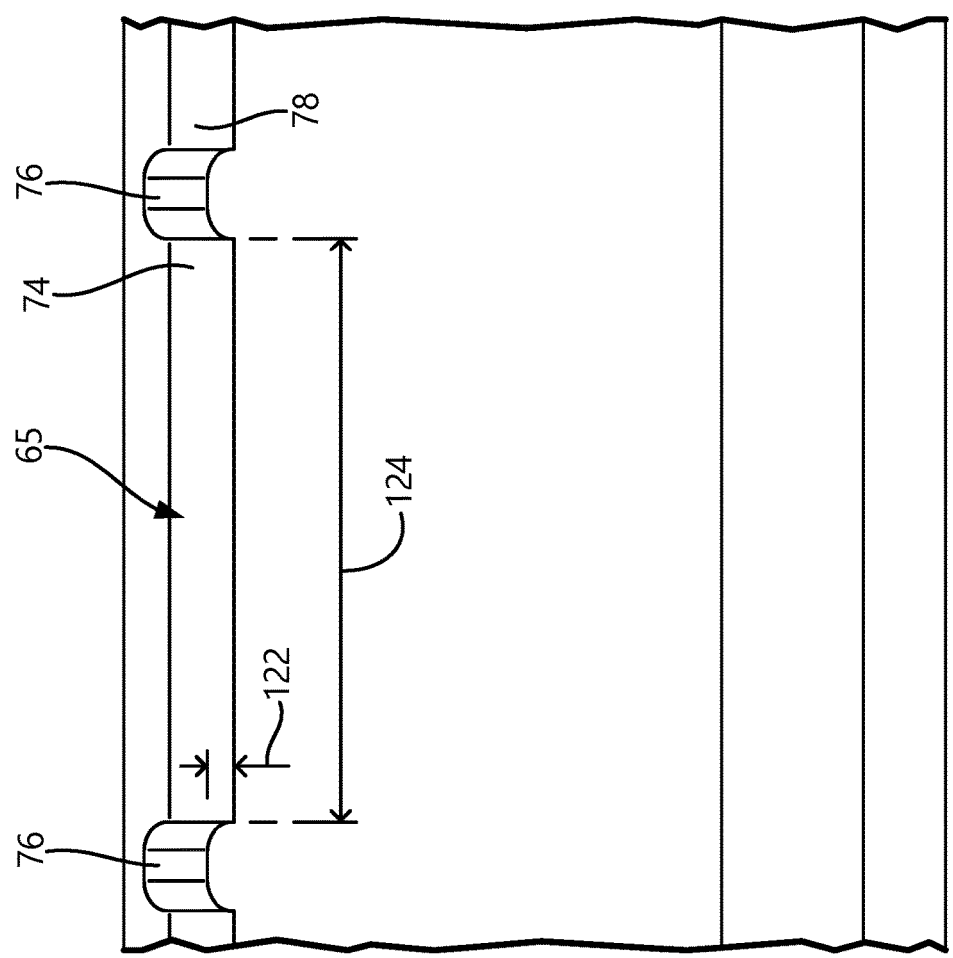
FIG. 6 is a cross-sectional perspective view of a portion of a degassing module of the present invention.

In the example embodiment illustrated in FIGS. 4-6 with substantially rectangular cross-section first channel 65, and with width "W" representing first channel width 124, and a height "H" representing first channel depth 122, the hydraulic diameter may be calculated as follows:

$$D = \frac{4A}{P(\text{wetted perimeter})} = \frac{4(W*H)}{2*(W+H)} = \frac{2WH}{W+H} \qquad \text{Equation 3}$$

Substituting Equation 3 for D in equation 2 allows the determination of pressure drop Δp for each first channel 65 in terms of length L, viscosity μ, width W, height H and flow rate Q in the example embodiment.

$$\Delta p = \frac{8\mu L(W+H)^2 Q}{W^3 H^3} \qquad \text{Equation 4}$$

Using the above formulae with respect to the fluid in contact with membrane 50 at second flow field 64, a frictional fluid flow restriction can be calculated where the membrane total width representing the sum of all first channel array width is "$W_m$" and the channel depth is "$H_m$", and where $W_m \gg H_m$ (as in second flow field 64), total pressure drop for second flow field 64 $\Delta p_m$ may be calculated as:

$$\Delta p_m = \frac{8\mu L_m Q}{W_m H_m^3} \qquad \text{Equation 5}$$

This relationship demonstrates that the flow resistance is inversely proportional to the third power of the channel depth, $H_m$.

To determine the frictional flow restriction for either of first or second manifolds (first or third flow fields 62, 66), the same equations may be used. For example, if the manifold has a rectangular cross-section with its width much larger than its depth, the frictional flow restriction of the manifold may be calculated as follows:

$$\Delta p_d = \frac{8\mu L_d Q}{W_d H_d^3} \qquad \text{Equation 6}$$

Wherein,
$L_d$=length of manifold (manifold length 130)
$W_d$=manifold width (width 114)
$H_d$=manifold height (height 112)

In the event that first or third flow fields 62, 66 are configured differently than the rectangular shape described above, one may calculate the hydraulic diameter as follows:

$$D_d = \frac{4A}{P(\text{wetted perimeter})} \qquad \text{Equation 7}$$

The hydraulic diameter may then be inserted into Equation 2 above to calculate the frictional flow restriction for first or third flow fields 62, 66.

Conventional degassing systems lack control of design parameters as they relate to frictional flow restriction, and particularly to designed control of frictional fluid flow restriction to ensure complete flow distribution across the membrane contact area. Instead, conventional degassing systems are influenced by non-uniform fluid pathways contacting the membrane, and localized flow resistance affecting the distribution of fluid flow into contact with the membrane. As a result, conventional degassing systems fail to take advantage of the full available efficiency of a membrane degassing system.

Considering the simple conventional case of a degassing module having only a fluid entrance hole and a fluid exit hole in the housing to provide for fluid supply and removal from the retentate side of the membrane, the distribution of the fluid flow into contact with the membrane is non-uniform. In order to determine the relative frictional flow restrictions between the entrance/exit region and the fluid/membrane contact region of this example conventional use, we assign, for example, a section of fluid flow adjacent the entrance and exit hole being 0.1 inches wide by 0.005 inches high and 1.5 inches long, while the section of fluid flow as it follows a flow path in contact with the membrane from the entrance region to the exit region as being 1.5 inches wide and 4 inches long. The frictional flow restriction at the membrane contact region (Equation 5) is divided by the frictional flow restriction at the entrance/exit region (Equation 6).

$$\frac{\Delta p_d}{\Delta p_m} = 15.$$

This means that the entrance/exit flow regions have much higher flow resistance than the fluid/membrane contact region. Computational flow dynamics calculations have shown non-uniform distribution across the membrane contact area in such cases.

If, instead, an inlet manifold and an outlet manifold is provided with a square cross-sectional shape with dimensions of W×H×L=0.05"×0.05"×1.5", and a fluid/membrane contact region (second flow field) W×H×L=1.5"×0.005"×1.5", the resultant flow restriction comparison is:

$$\frac{\Delta p_d}{\Delta p_m} = 3\%.$$

Thus, in this case, the inlet and outlet manifold have a much lower frictional flow restriction than that of the fluid/ membrane contact region. Accordingly, the fluid will flow uniformly across the membrane, achieving optimal flow distribution and maximum contact with the membrane.

Advantageously to adaptability to instrument designs which have physical limitations where fluid entry and exit may occur, solvent inlet 18, fluid connecting bore 17 and the corresponding outlet connection may be positioned at any point and in any feasible direction along track 16 and track 27. Thus the path which the fluid follows need not be reconfigured and tested when the inlet and outlet need to be repositioned to accommodate a different instrument design.

Applicants have determined that a relative frictional flow restriction as between first flow field 62 (and third flow field 66) and second flow field 64 may be determinative of an ability to achieve uniform fluid flow distribution across the membrane contact area. A relative frictional flow restriction as between first and third flow fields 62, 66 ($\Delta P_d$) to the frictional flow restriction at second flow field 64 ($\Delta P_m$) is preferably less than about 50% in order to achieve desired fluid flow distribution across the membrane contact area. The relative fluid flow restriction $$\frac{\Delta p_d}{\Delta p_m}$$

is preferably less than 20%, and most preferably less than 10% to achieve desired fluid distribution across the membrane contact area. One criteria to evaluate uniform fluid flow distribution is to compare the slowest fluid velocity to the highest fluid velocity in second flow field 64. Under perfect uniform flow distribution, $V_{max}=V_{min}$, $(V_{max}-V_{min})/V_{min}=0$. For poor flow distribution, $V_{min}=0$ $((V_{max}-V_{min})/V_{min}=\infty)$. Preferably, $$\frac{\Delta p_d}{\Delta p_m} \leq 50\%$$

and $(V_{max}-V_{min})/V_{min} \leq 50\%$. In this case, the fluid velocity in second flow field 64 is substantially uniform.

Figure 11A:
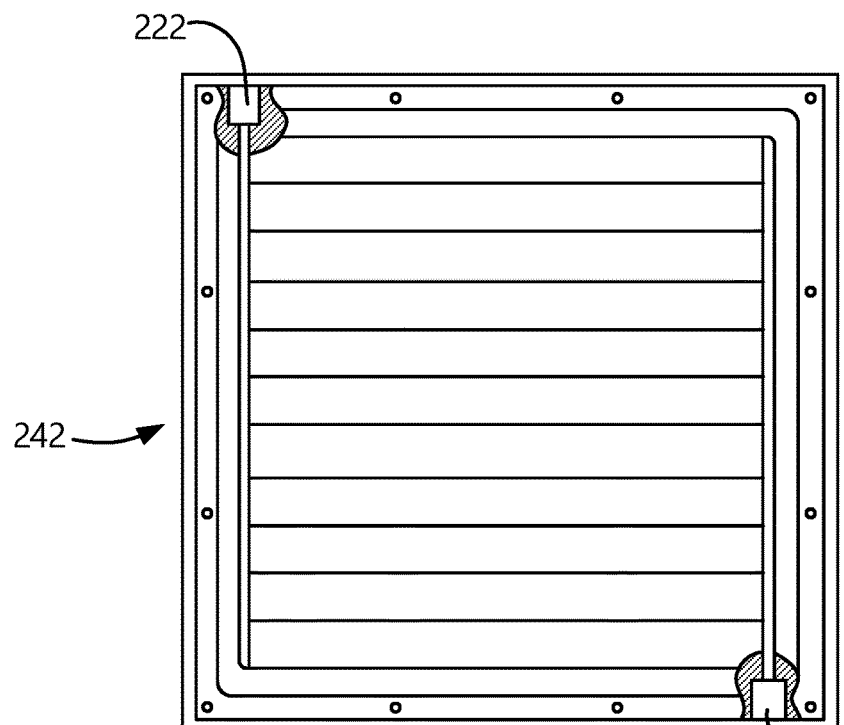
FIG. 11A is a partial cut-away top view of a portion of a degassing module of the present invention.
Figure 11B:
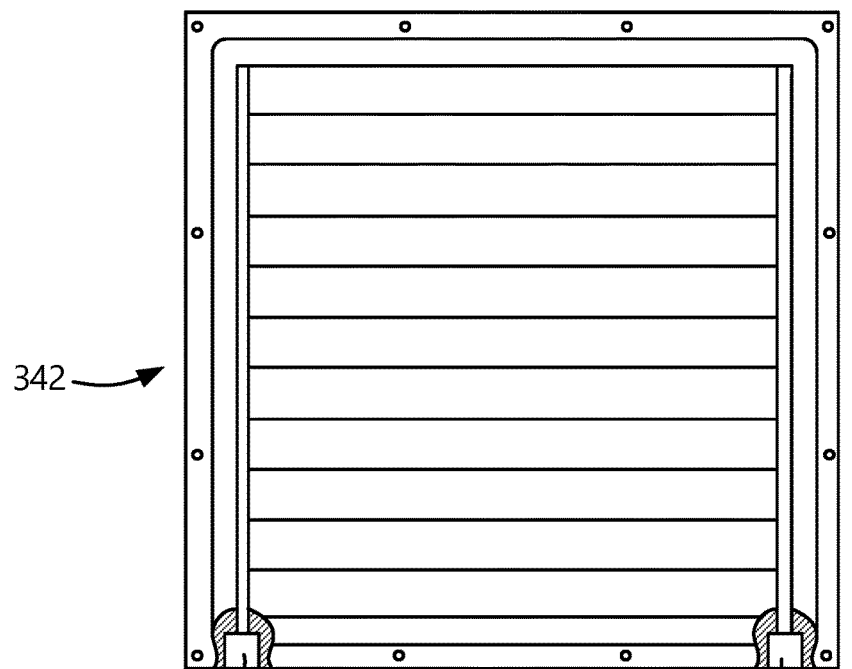
FIG. 11B is a partial cut-away top view of a portion of a degassing module of the present invention.
Figure 12A:
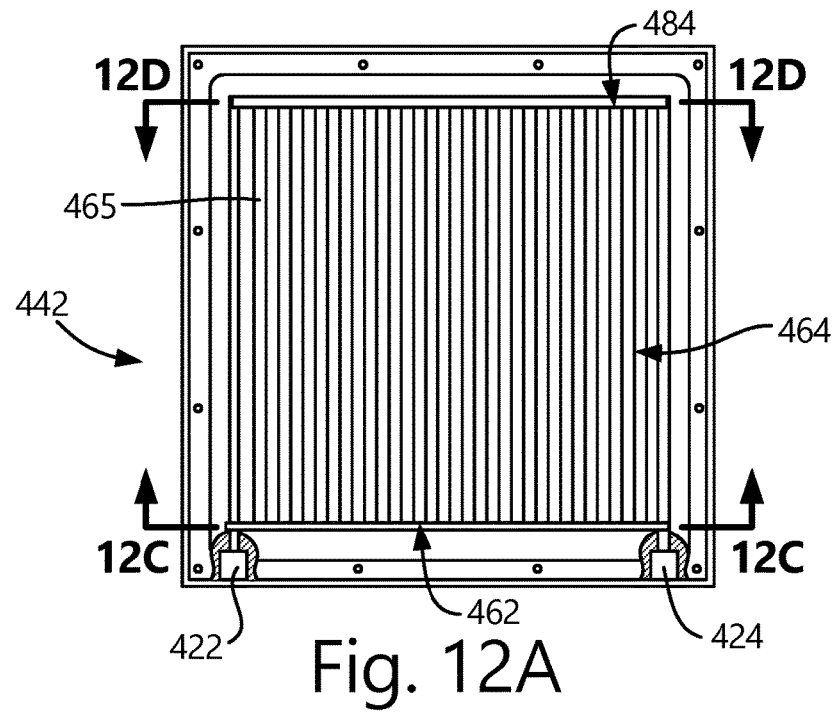
FIG. 12A is a partial cut-away top view of a portion of a degassing module of the present invention.
Figure 12B:
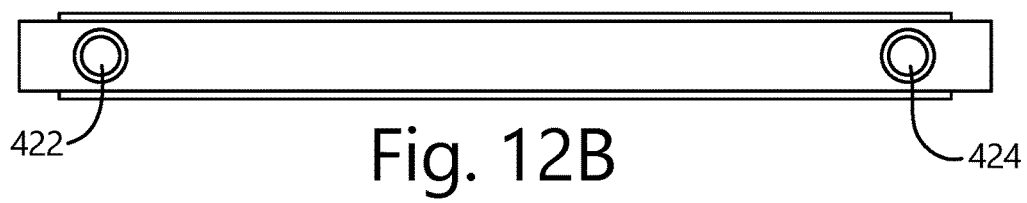
FIG. 12B is a side elevational view of the portion of the degassing module illustrated in FIG. 12A.
Figure 12C:
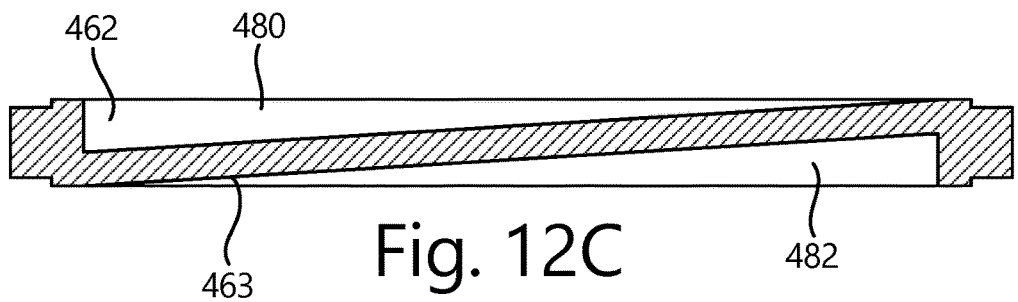
FIG. 12C is a cross-sectional side elevational view of a portion of the degassing module illustrated in FIG. 12A.
Figure 12D:
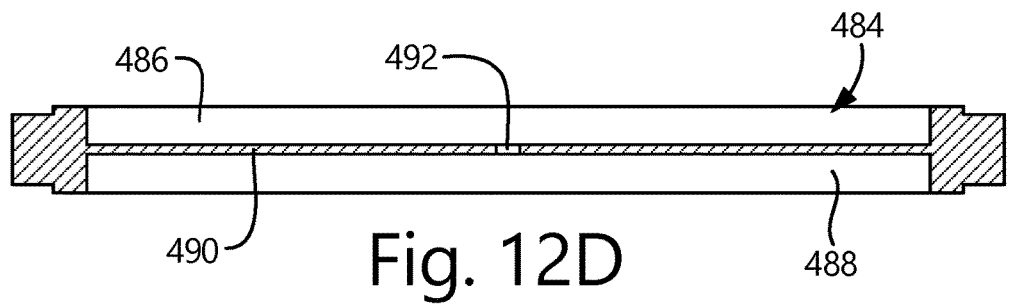
FIG. 12D is a cross-sectional side elevational view of a portion of the degassing module illustrated in FIG. 12A.
Figure 13:
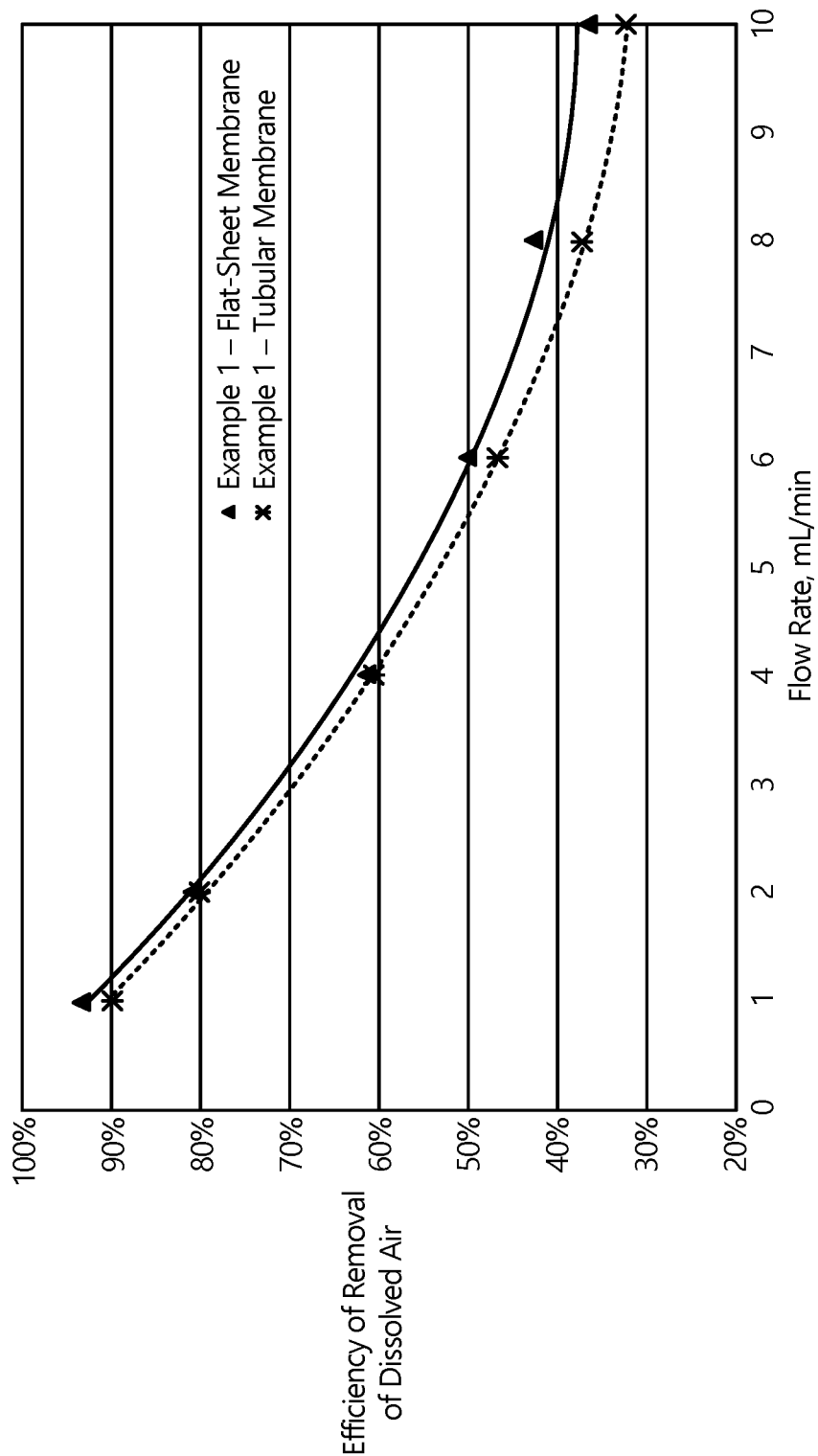
FIG. 13 is a comparison chart comparing degassing efficiency between flat sheet and tubing membranes.
Figure 14:
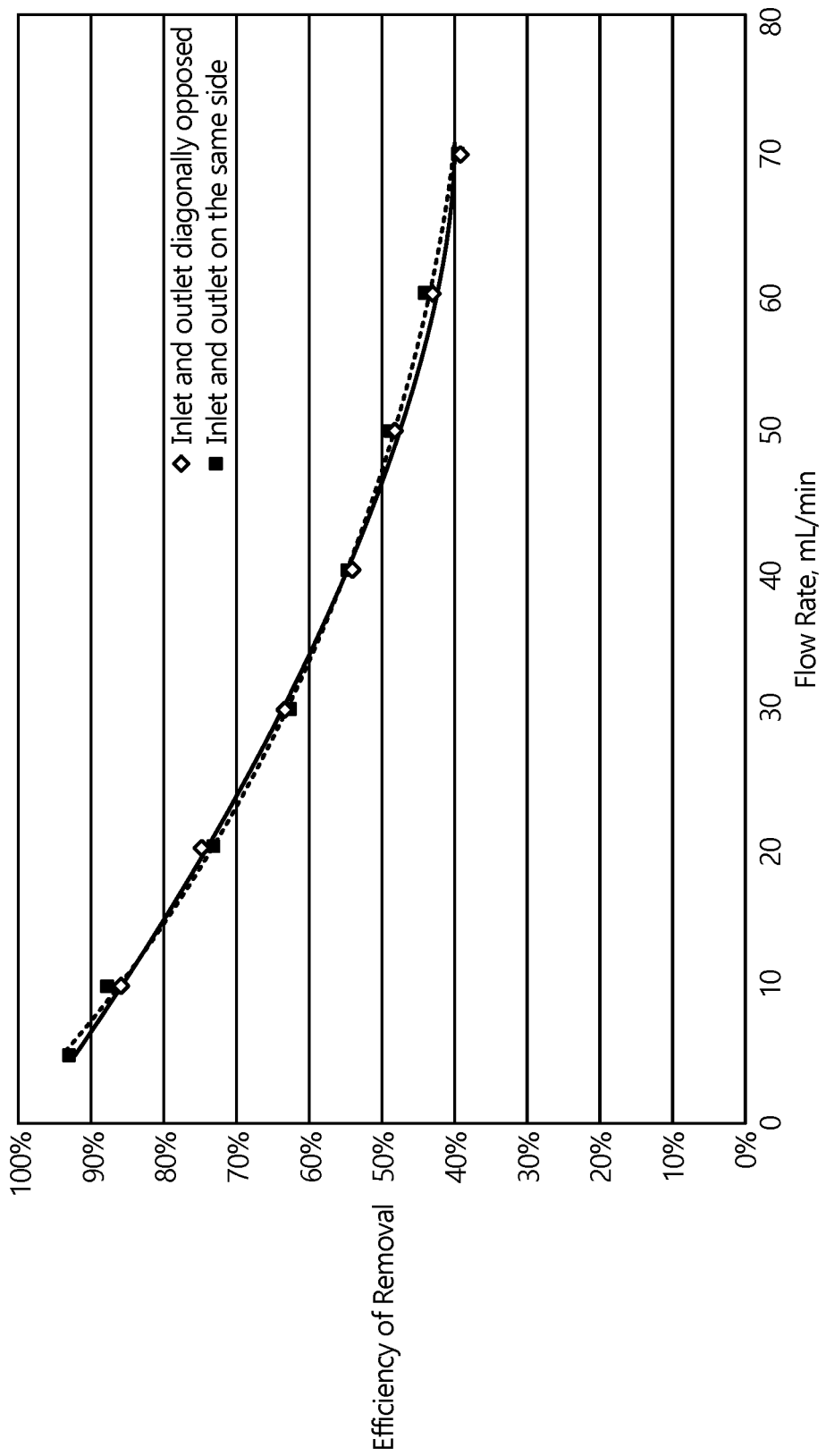
FIG. 14 is a chart illustrating degassing efficiency comparison of degassing modules of the present invention.
Figure 15:
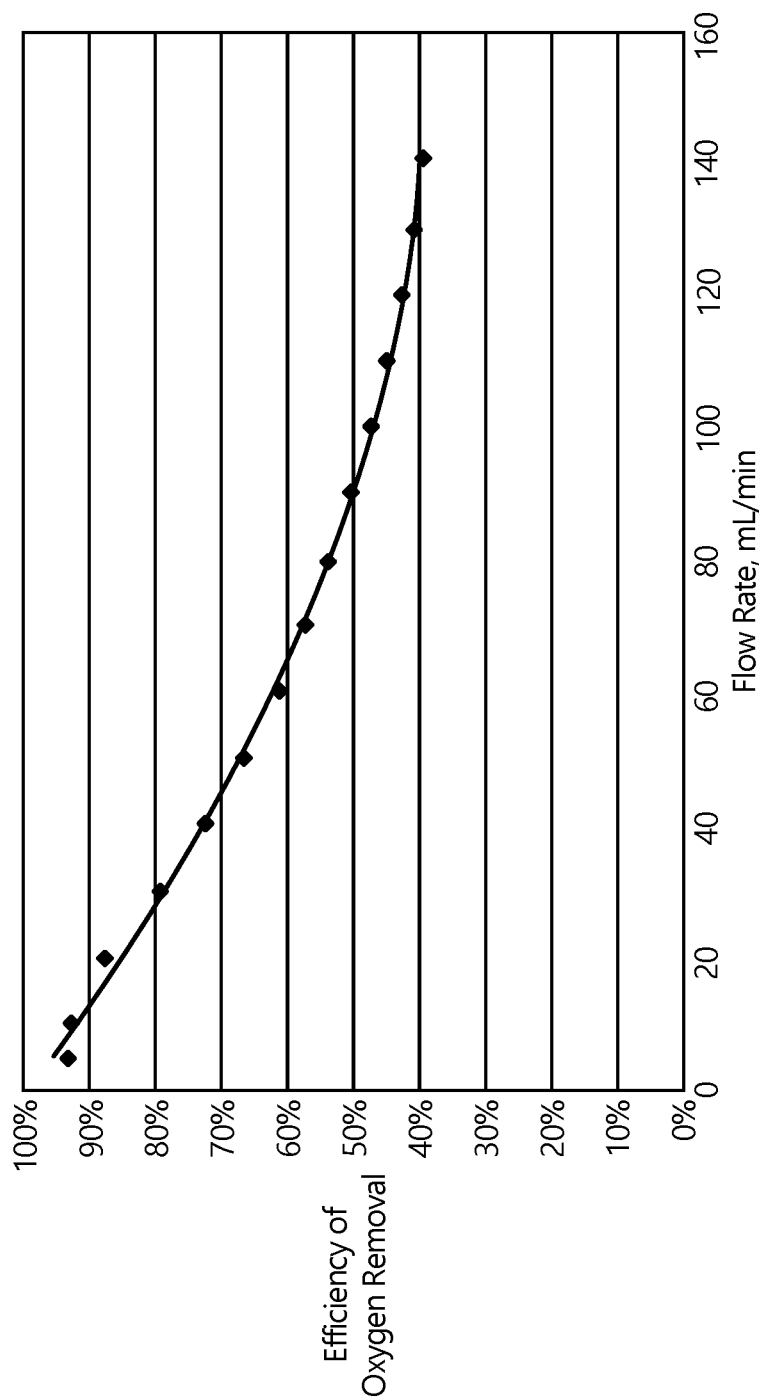
FIG. 15 is a chart illustrating degassing efficiency of a degassing module of the present invention.

It has also been found by the Applicant that, with the above design criteria, restrictions on physical fluid inlet and outlet locations at degassing module 20 are relieved. As a result, instrument designers have flexibility in positioning the liquidous fluid inlet and liquidous fluid outlet locations for degassing module 20, and can further provide flexibility in producing different model degassing modules 20 having various liquidous fluid inlet and liquidous fluid outlet locations at the module to best coordinate with respective instrumentation with which the degassing module 20 is intended to coordinate. FIGS. 11A and 11B illustrate example variations for the placement of the liquidous fluid inlet and liquidous fluid outlet. Fluid flow plate 242 of FIG. 11A includes a liquidous fluid inlet 222 that is positioned at an opposite end of plate 242 from liquidous fluid outlet 224. By contrast, fluid flow plate 342 illustrated in FIG. 11B includes liquidous fluid inlet and outlet 322, 324 positioned at a common end of plate 342. Many other arrangements for the liquidous flow into and out from the degassing modules of the present invention are contemplated by the present invention.

For each type of membrane, the surface area and fluid layer thickness along with the efficiency of gas transport per unit area of membrane should also be taken into account in the overall design of the degasser. It is well understood that thin membranes are more efficient at transporting gas from a liquid, such as a mobile phase, into a vacuum than relatively thick membranes of the same material type. Conventionally, the membrane itself offers the greatest restriction to gas transport from the flowing mobile phase, and therefore requires a relatively high surface area to achieve a desired level of degassing, such as 38% residual air which has been shown to be sufficient for preventing bubble formation when various concentrations of methanol and water are mixed at atmospheric pressure.

Using the above design criteria, several devices were manufactured and tested.

Example 1

HPLC degassing of flows to 10 mL/min with a target maximum flow restriction of using a composite Teflon® AF membrane lower than 15 hectopascals when water is flowing through the degasser at 10 milliliters per minute.

TABLE 1

| Manifold dimensions | Inlet Manifold (First Flow Field) | Outlet Manifold (Third Flow Field) |
|---|---|---|
| Length | 38.1 mm | 38.1 mm |
| Width | 1.27 mm | 1.27 mm |
| Depth | 1.27 mm | 1.27 mm |
| Flow resistance (hPa) | 0.37 | 0.37 |

Now considering the cross-flow channels as a whole where each of the channels connecting the inlet manifold to the outlet manifold comprises a segment of the whole active surface:

TABLE 2

| Channel Dimensions | Individual Channel (flow rate evenly distributed among 15 channels) | 15 × Channels (uniform flow distribution) |
|---|---|---|
| Length | 28.3 mm | 28.3 mm |
| Width | 2.54 mm | 38.1 mm |
| Depth | 0.127 mm | 0.127 |
| Flow resistance (hPa) | 5.3 | 4.9 |
| Total membrane crossflow restriction, hPa | 4.9 | |

As the inlet flow restriction and the outlet flow restriction are paired in the distribution of the fluid across the membrane, the relationship between the manifolds and the total flow restriction across the membrane in the channels is the quotient of the flow rotation at the manifolds divided by the membrane crossflow restriction through the channels, which gives 15.2%. This relative flow restriction provides degassing performance that matches or exceed the performance of tubing based degassers, in which the internal volume is much greater than the open volume of the present sheet-form membrane degassing module. A comparison between the present degassing module with a total internal volume of 250 microliters and a degasser manufactured using tubing with an internal volume of 1.1 mL demonstrates the degassing efficiency obtained using the present flow distribution enables a degasser at least equal in performance to prior art tubing based degassers, yet with significantly reduced volume (0.25 ml vs. 1.1 mL) and significantly lower flow resistance (5.3 hPa vs. 11.2 hPa).

Example 2: 100 mL/Min Degassing of Water with 145 sq. Cm. Surface Area Composite Film Membrane Flow Restriction Calculations

TABLE 3

| Manifold Dimensions | Inlet Manifold | Outlet Manifold |
|---|---|---|
| Width | 12 cm | 12 cm |
| Length | .23 cm | .23 cm |
| Depth | .8 cm | .8 cm |
| Flow resistance (hPa) | 1.16 | 1.16 |
| Flow rate = 100 mL/min | | |
| Total membrane crossflow restriction, hPa 2700 | | |

The efficiency of removal of oxygen from water flowing through the degassing system presented demonstrates the position of the liquidous fluid inlet and liquidous fluid outlet has no effect on the efficiency of degassing. The principal wherein the flow restriction across the face of the membrane at the second flow field is greater than that in the inlet and outlet manifolds (first and third flow fields) thus is shown to be independent of the relative position of the liquidous fluid entrance points into the associated manifolds.

This guiding principle of relative flow restriction also enables designs of multiple membrane systems wherein a flowing fluid is introduced into a fluid track on one side of a two sided fluid plate, distributed across a membrane, collected into an internal fluid track, transferred to a second side of a fluid plate into a distribution fluid track, thence across a second membrane to an outlet fluid track.

Example 3: Dual Side Flow Distribution

A dual sided fluid contact plate 442 is shown in FIGS. 12A-12D wherein fluid enters the degassing module through a liquidous fluid inlet 422, and into an inlet manifold 480 making up first flow field 462. In the illustrated embodiment, the inlet manifold 480 includes a ramp-shaped base 463, that also serves as a divider between inlet manifold 480 and an outlet manifold 482. Base 463 may be substantially ramp-shaped so that liquidous fluid inlet and liquidous fluid outlet 422, 424 may be substantially co-planar. Other arrangements for base 463, including non-angled arrangements, are contemplated by the present invention. Fluid flow in inlet manifold 480 may be distributed into second flow field 464 made up of an array of first channels 465 for contact with the membrane. Fluid flow from second flow field 464 is delivered to a basin 484 that may be divided into first and second portions 486, 488 by a divider 490 having one or more openings 492 to permit fluid to pass from first portion 486 to second portion 488. The fluid flow may then be distributed to a plurality of second channels 494 on the opposite side of plate 442. Fluid passing across the second side of plate 442 through second channels 494 may be collected in outlet manifold 482 and thence out of the degassing module through liquidous fluid outlet 424.

The degassing apparatus described in Examples 1, 2 and 3 clearly demonstrate the use of distribution manifolds and fluid transport channels which support a membrane and distribute fluid uniformly across its surface. The stated relationship between manifold flow restriction and cross-membrane channel flow restriction has also been shown to cause similar degassing behavior as contactors using tubular membranes, but in smaller volumes. This fluid distribution means described in this invention and the relationship allows many different configurations and locations of inlets and outlets without an established design of the contact surface area. These rules allow adjustment of dimensions for both the manifolds and the cross-membrane channels to meet differing needs regarding flow restriction.

The invention has been described herein in considerable detail in order to comply with the patent statutes, and to provide those skilled in the art with the information needed to apply the novel principles and to construct and use embodiments of the invention as required. However, it is to be understood that the invention can be carried out by specifically different devices and that various modifications can be accomplished without departing from the scope of the invention itself.

What is claimed is:

1. A liquid degassing apparatus, comprising:
   a module having a semi-permeable membrane disposed in a chamber and dividing said chamber into a permeate side and a retentate side, said permeate side including a first port, and said retentate side including:
   an inlet liquid manifold fluidically connected to an inlet port and configured to exert a first frictional flow restriction upon a liquid flow therethrough;
   an outlet liquid manifold fluidically connected to an outlet port, and configured to exert a second frictional flow restriction upon the liquid flow therethrough; and
   a channel array including a plurality of channels extending between and fluidically connecting said inlet and outlet liquid manifolds, said channels being separated from one another by respective dividers, each of said channels being configured to exert a channel frictional flow restriction upon the liquid flow therethrough, wherein a sum of said first and second frictional flow restrictions is no greater than about 50% of a sum of said channel frictional flow restrictions.

2. A liquid degassing apparatus as in claim 1, wherein each channel frictional flow restriction is substantially equal.

3. A liquid degassing apparatus as in claim 2, including a diffuser disposed in said chamber at said permeate side between said membrane and a chamber wall.

4. A liquid degassing apparatus as in claim 3, wherein said diffuser urges said membrane into contact with brace surfaces of said divider walls.

5. A liquid degassing apparatus as in claim 4 wherein said brace surfaces are substantially planar, each brace surface being coextensive with a brace plane.

6. A liquid degassing apparatus as in claim 3 wherein said diffuser is porous to provide a diffuser frictional flow restriction upon a gas flow therethrough, said diffuser frictional flow restriction being less than 1 mm Hg.

7. A liquid degassing apparatus as in claim 6 wherein said diffuser includes a woven polymer fabric structure.

8. A liquid degassing apparatus as in claim 1 wherein said liquid-impermeable membrane is non-porous but gas permeable.

9. A liquid degassing apparatus as in claim 1, including a pump fluidically connected to said first port for evacuating said permeate side of said module.

10. A degassing apparatus, comprising:
    a module having a first plate connected to a second plate to define a degassing chamber therebetween, and a semi-permeable membrane secured between said first and second plates to separate said chamber into a permeate side and a retentate side, said first plate including a fluid flow path defined by a first manifold, a second manifold, and a first channel array having a plurality of first channels fluidically connecting said first manifold to said second manifold, said fluid flow path being configured to convey a fluid flow through said retentate side of said chamber and into contact with said membrane, said first manifold being configured to exert a first frictional flow resistance upon the fluid flow, said second manifold being configured to exert a second frictional flow resistance upon the fluid flow, and each of said channels in said channel array being configured to exert a substantially equal channel frictional flow resistance upon the fluid flow, wherein a sum of said first and second frictional flow restrictions is suitable to permit substantially uniform fluid flow along said channel array while in contact with said membrane, said permeate side of said chamber being evacuatable through a first port.

11. A degassing apparatus as in claim 10, wherein said sum of said first and second frictional flow restrictions being no greater than about 10% of a sum of said channel flow restrictions.

12. A degassing apparatus as in claim 11 wherein said first port is disposed in said second plate.

13. A degassing apparatus as in claim 11, including a fluid inlet port in said first plate fluidically coupled to said first manifold, and a fluid outlet port in said first plate fluidically coupled to said second manifold.

14. A degassing apparatus as in claim 13 wherein the fluid flow is conveyed along said fluid path from said fluid inlet port to said first manifold, wherein the fluid flow is distributed substantially equally to said channels of said channel array to flow for collection at said second manifold.

15. A degassing apparatus as in claim 14 wherein the fluid flow is conveyed from said second manifold to said fluid outlet port.

16. A degassing apparatus as in claim 11 wherein said channels are separated from one another by respective divider walls.

17. A degassing apparatus as in claim 16 wherein said divider walls are substantially parallel to one another.

18. A degassing apparatus as in claim 17 wherein said channels are substantially perpendicular to said first and second manifolds.

19. A degassing apparatus as in claim 18 wherein said first and second manifolds comprise troughs in said first plate, said first manifold comprising a first trough extending in fluid communication with respective first ends of said first channels, and said second manifold comprising a second trough extending in fluid communication with respective second ends of said first channels.

20. A degassing apparatus as in claim 16 wherein said divider walls are integrally formed with said first plate.

21. A degassing apparatus as in claim 19 wherein each of said first channels has a hydraulic diameter, determined by a width and a depth of said first channel.

22. A degassing apparatus as in claim 21 wherein each of said first channels has an equal hydraulic diameter.

23. A degassing apparatus as in claim 22 wherein each of said first channels has an equal channel depth.

24. A degassing apparatus as in claim 23 wherein said first and second troughs have a trough depth that is greater than said channel depth.

25. A degassing apparatus as in claim 16, including a porous diffuser disposed at said permeate side of said chamber between said membrane and said second plate, said diffuser being arranged to urge said membrane into contact with brace surfaces of said divider walls.

26. A degassing apparatus as in claim 10 wherein said semi-permeable membrane is non-porous, liquid-impermeable, and gas-permeable.

27. A degassing apparatus as in claim 10, including a second channel array having a plurality of second channels fluidically connecting a third manifold to a fourth manifold along said fluid flow path, wherein said third manifold is arranged to receive the fluid flow from said second manifold.

28. A degassing apparatus as in claim 27 wherein said channel array is disposed at a first side of a first plate, and said second channel array is disposed at a second side of said first plate.

29. A degassing apparatus as in claim 28, including a second semi-permeable membrane secured between said second side of said first plate and said second plate.

30. A degassing apparatus as in claim 29, including a fluid inlet port in said first plate fluidically coupled to said first manifold, and a fluid outlet port in said first plate fluidically coupled to said fourth manifold.

31. A method for reducing a target gas concentration in a fluid, said method comprising:
(a) providing a module as in claim 10;
(b) motivating the fluid along the fluid flow path in contact with the semi-permeable membrane; and
(c) reducing a partial pressure of the target gas in said permeate side of said chamber to a level that is lower than the target gas partial pressure in the fluid.

32. A method as in claim 31, including evacuating said permeate side of said chamber through said first port with a pump.

* * * * *